(12) United States Patent
Parsons

(10) Patent No.: US 12,090,809 B1
(45) Date of Patent: *Sep. 17, 2024

(54) WEIGHT TRANSFER LINKAGE

(71) Applicant: Vecodyne, Inc., Estero, FL (US)

(72) Inventor: Charles Parsons, Estero, FL (US)

(73) Assignee: Vecodyne, Inc., Estero, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,674

(22) Filed: Aug. 1, 2022

Related U.S. Application Data

(63) Continuation of application No. 17/816,668, filed on Aug. 1, 2022.

(60) Provisional application No. 63/227,686, filed on Jul. 30, 2021.

(51) Int. Cl.
*B60G 3/26* (2006.01)
*B62D 17/00* (2006.01)

(52) U.S. Cl.
CPC ............... *B60G 3/26* (2013.01); *B62D 17/00* (2013.01)

(58) Field of Classification Search
CPC .......... B60G 2204/124; B60G 2202/12; B60G 2200/143; B60G 21/05; B60G 3/26; B62D 17/00

See application file for complete search history.

(56) References Cited

U.S. PATENT DOCUMENTS

| | | | | |
|---|---|---|---|---|
| 4,373,743 A * | 2/1983 | Parsons, Jr. | ............ | B62D 17/00 280/86.757 |
| 6,267,387 B1 | 7/2001 | Weiss | | |
| 6,408,970 B1 * | 6/2002 | Eng | ............ | F16F 3/10 188/274 |
| 7,631,721 B2 * | 12/2009 | Hobbs | ............ | B60G 21/05 180/378 |
| 7,644,935 B2 * | 1/2010 | Munster | ............ | F16F 15/02 280/124.147 |
| 7,963,538 B2 | 6/2011 | Roland et al. | | |
| 8,517,456 B1 * | 8/2013 | Eng | ............ | B62D 33/0608 280/124.179 |

(Continued)

FOREIGN PATENT DOCUMENTS

| | | | |
|---|---|---|---|
| CN | 110654192 A | * | 1/2020 |
| CN | 111137088 A | * | 5/2020 |

(Continued)

OTHER PUBLICATIONS

PCT/US2022/074395 International Search Report and Written Opinion, dated Nov. 25, 2022, 11 pages.

*Primary Examiner* — Amy R Weisberg
*Assistant Examiner* — Maxwell L Meshaka
(74) *Attorney, Agent, or Firm* — Matthew Cox; Holland & Knight, LLP

(57) ABSTRACT

A wheel suspension system for a vehicle having a chassis, comprising an opposing pair of wheel uprights having a plurality of pickup points located thereon, an opposing pair of main axis arms, an opposing pair of integrated axis arms, an internal cambering system comprising opposing pairs of camber links and radius rods, and an internal springing system comprising a single spring shock and an opposing pair of spring levers having tension links attached thereon. An internal roll-controlling weight transfer system comprising an opposing pair of weight transfer links having attached springing shocks may also be included.

24 Claims, 22 Drawing Sheets

(56) References Cited

U.S. PATENT DOCUMENTS

| | | | |
|---|---|---|---|
| 9,216,624 B1 * | 12/2015 | Luttinen | B60G 3/20 |
| 9,517,673 B2 * | 12/2016 | Izak | B60G 17/00 |
| 9,545,976 B2 * | 1/2017 | Melcher | B62M 27/02 |
| 11,247,524 B2 * | 2/2022 | Zohar | B60G 3/26 |
| 11,400,790 B2 * | 8/2022 | Rajan | B60G 15/068 |
| 2006/0175787 A1 * | 8/2006 | Munster | H02K 7/06 |
| | | | 280/124.145 |
| 2007/0193815 A1 * | 8/2007 | Hobbs | B62D 9/02 |
| | | | 280/124.156 |
| 2010/0133775 A1 | 6/2010 | Roland et al. | |
| 2016/0159180 A1 | 6/2016 | Palatov | |
| 2021/0046793 A1 * | 2/2021 | Zohar | B60G 9/003 |
| 2021/0237530 A1 * | 8/2021 | Rajan | F16C 19/163 |

FOREIGN PATENT DOCUMENTS

| | | | | |
|---|---|---|---|---|
| CN | 111319678 A | * | 6/2020 | |
| CN | 114953874 A | * | 8/2022 | |
| DE | 102019129157 A1 | * | 4/2021 | |
| EP | 0827851 A1 | | 11/1998 | |
| EP | 1681182 A2 | * | 7/2006 | B60G 15/065 |
| GB | 2341362 A | * | 3/2000 | |
| KR | 10-2019-0070563 A | | 6/2019 | |
| WO | WO-03022604 A2 | * | 3/2003 | B60G 17/02 |
| WO | WO-2021157408 A1 | * | 8/2021 | |

\* cited by examiner

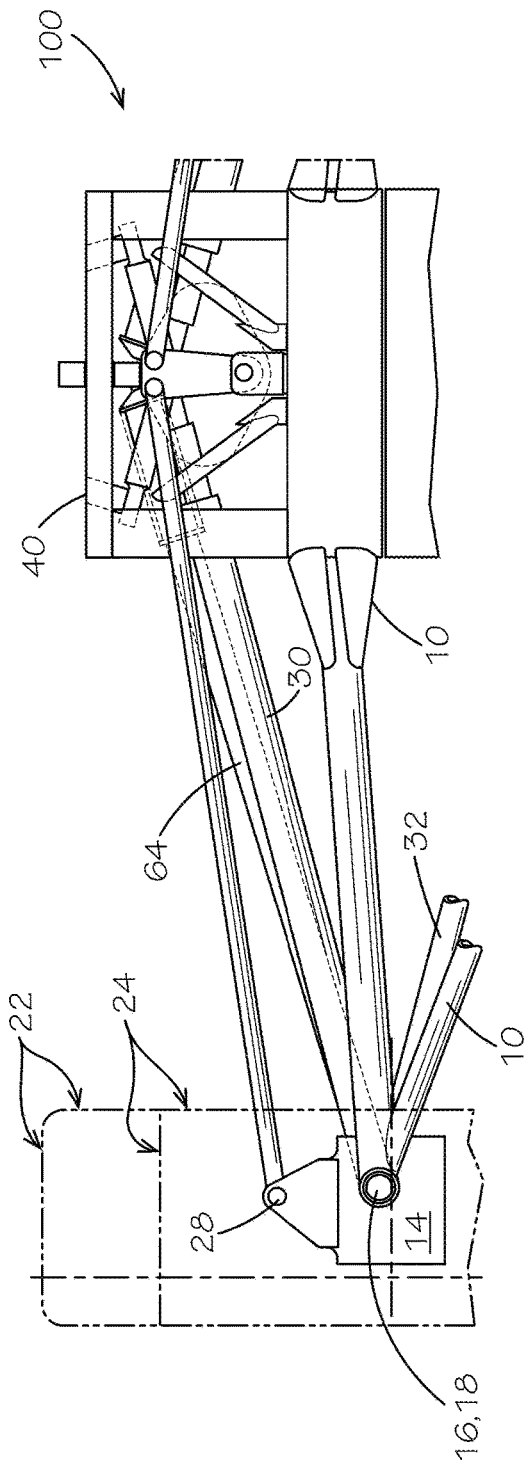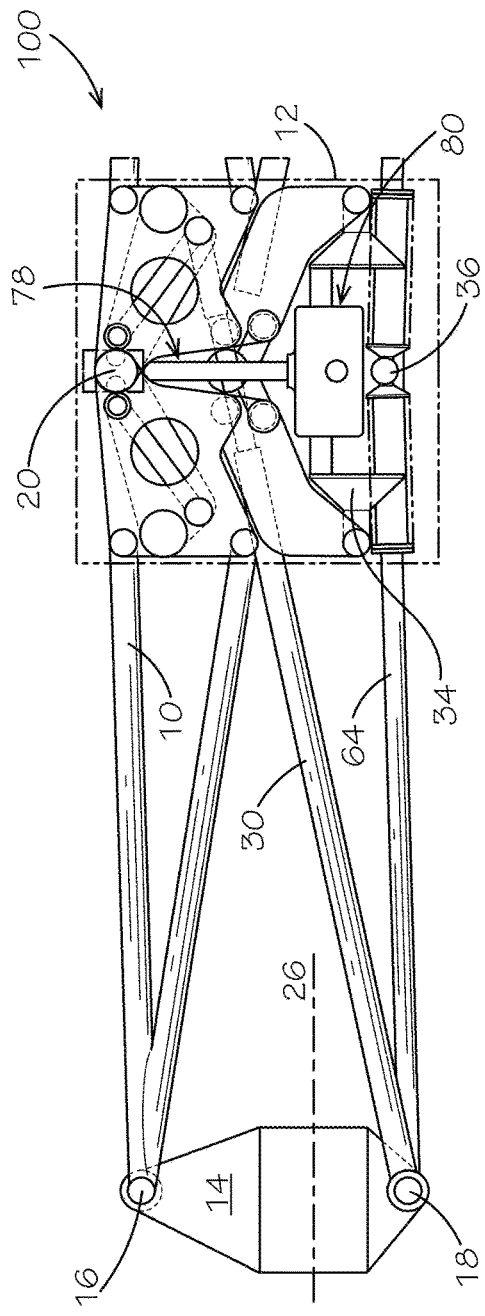
FIG. 1A
FIG. 1B

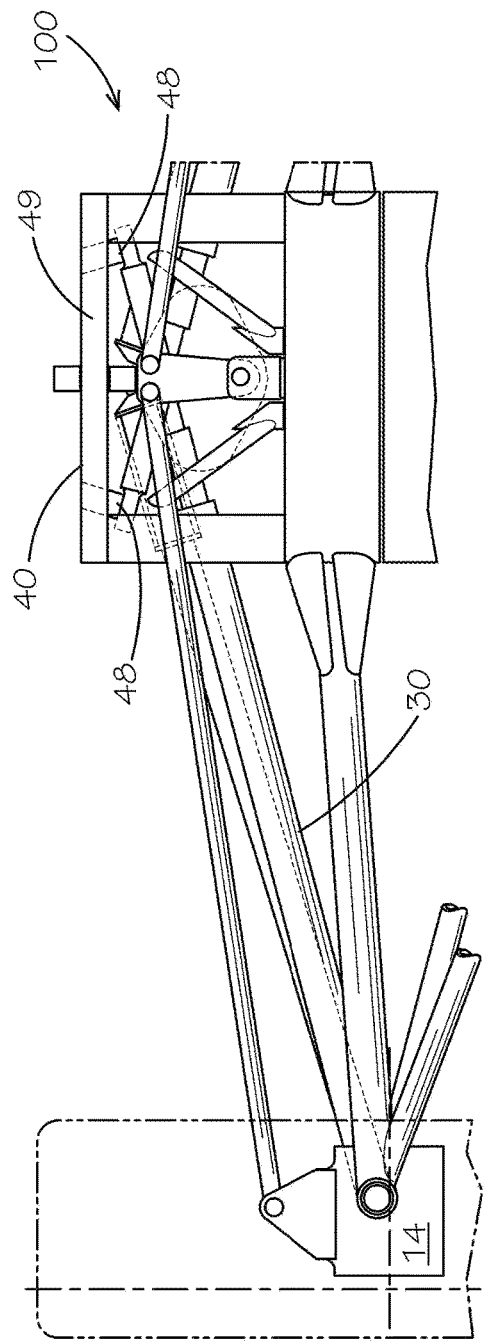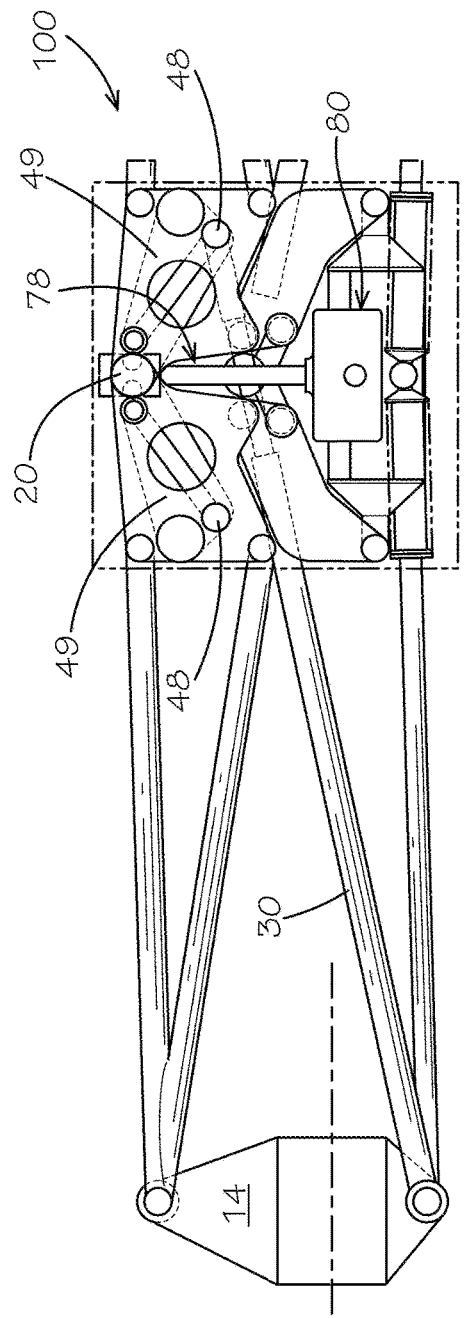

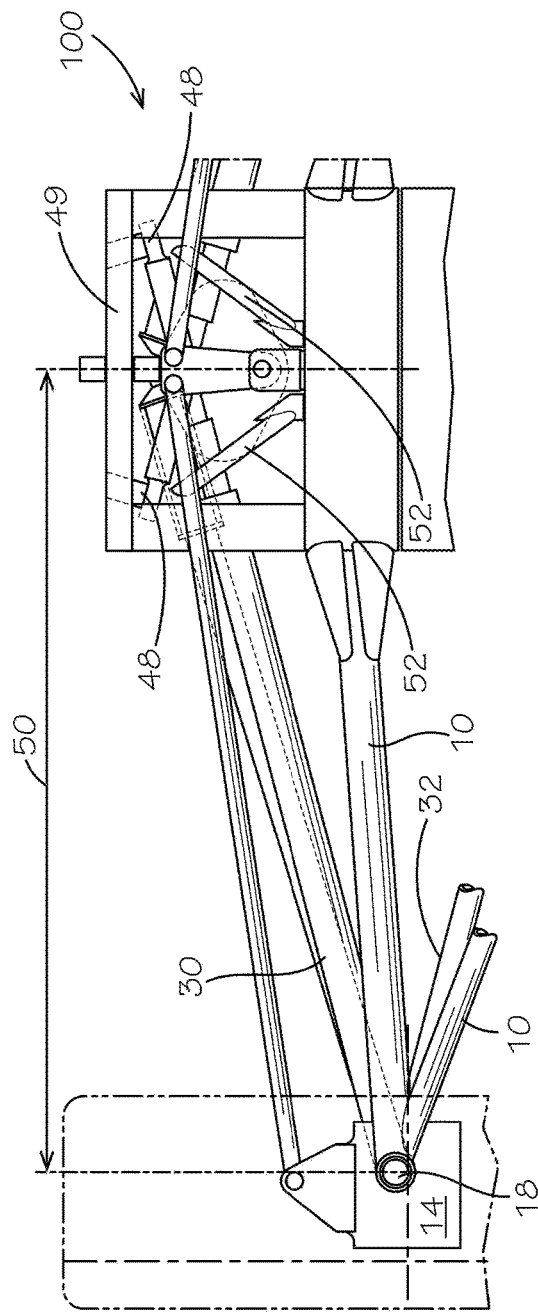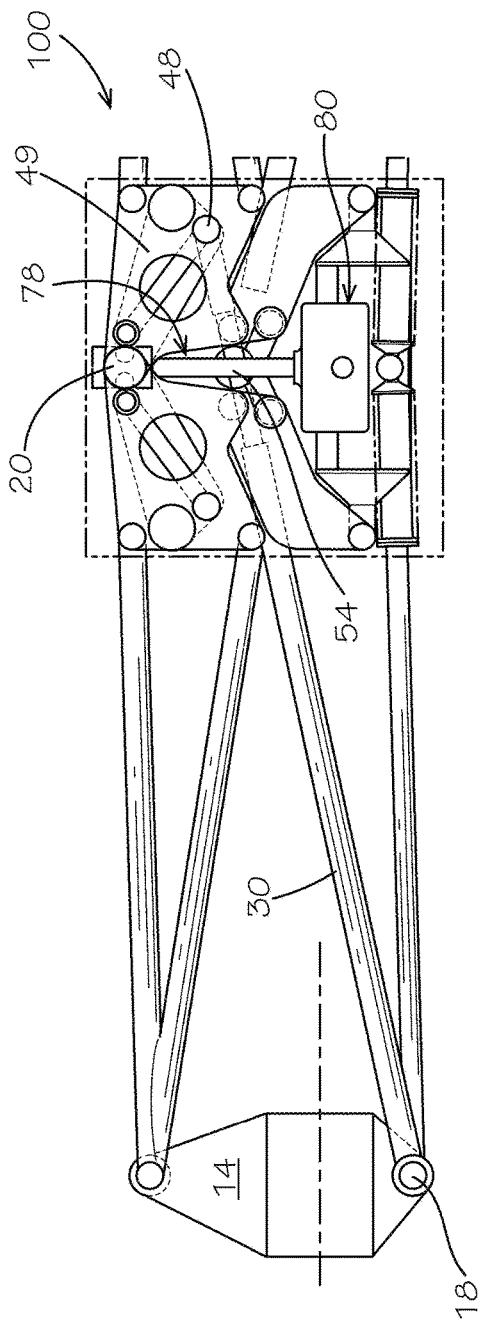
FIG. 4A
FIG. 4B

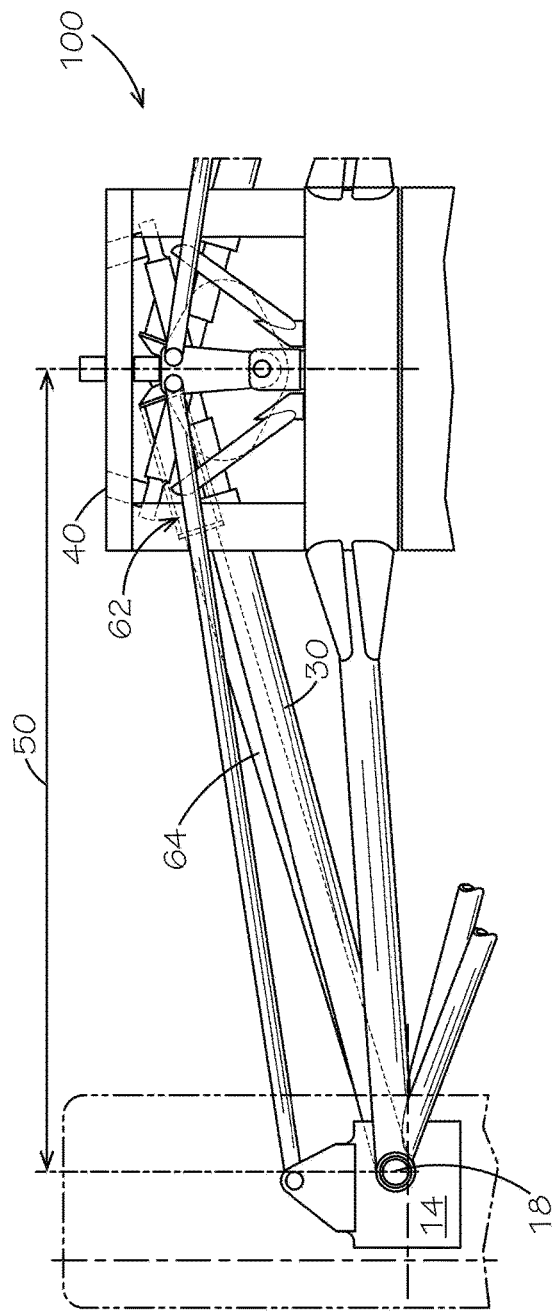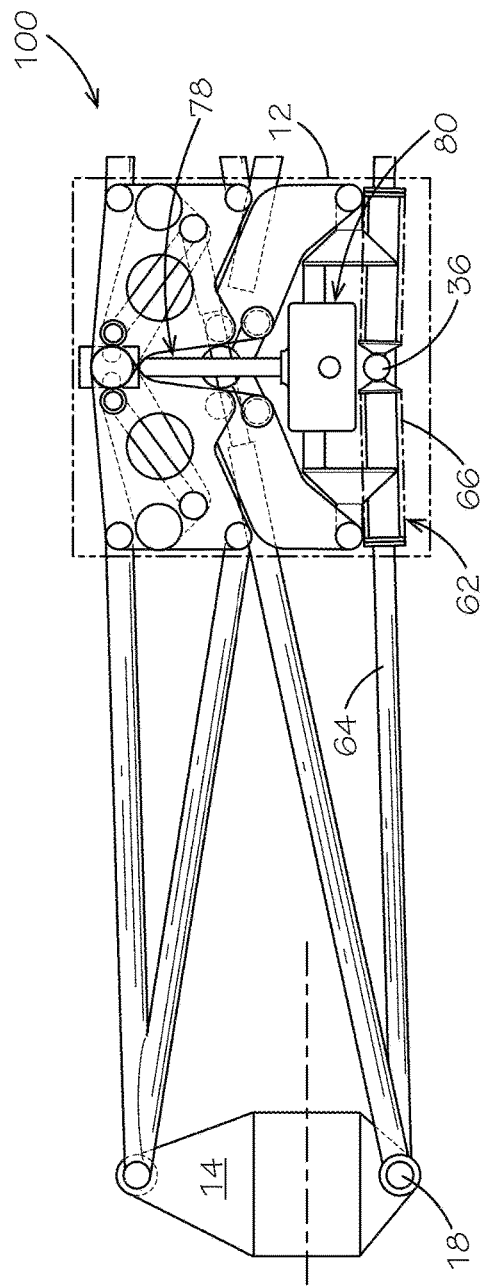
FIG. 6A
FIG. 6B

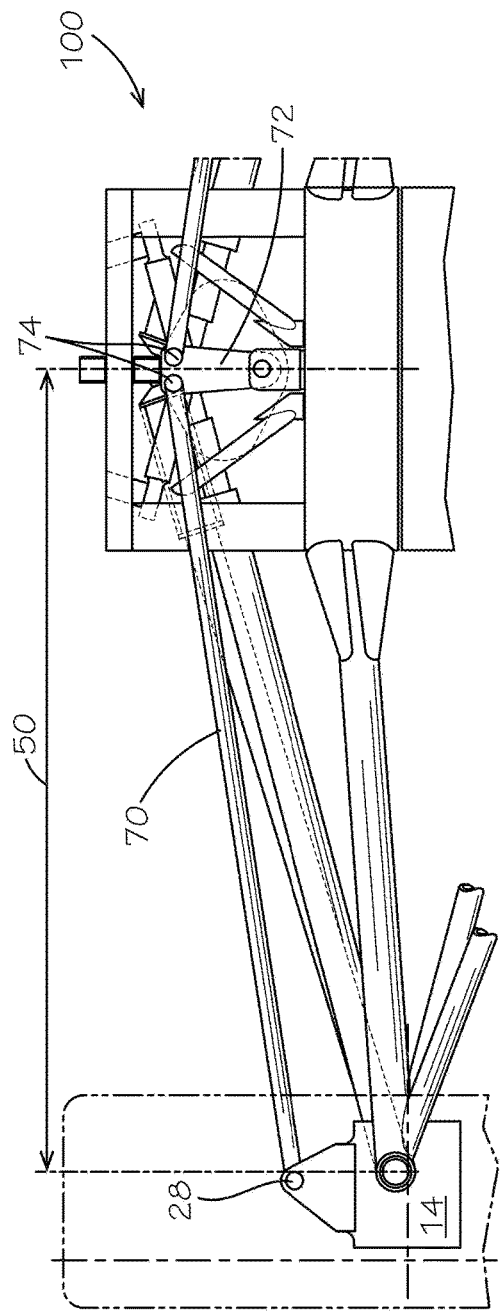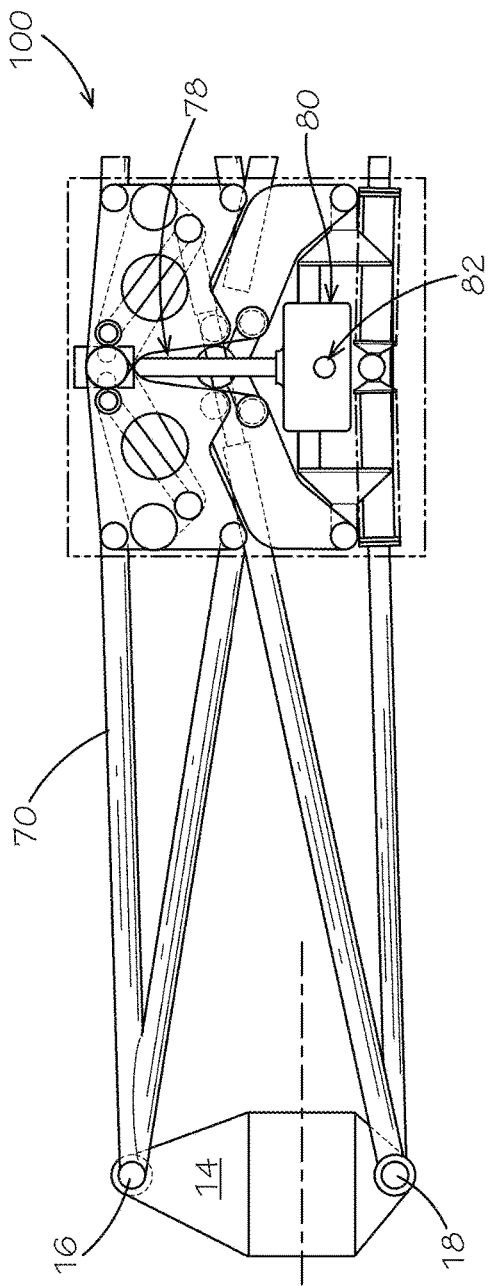
FIG. 7A
FIG. 7B

WEIGHT TRANSFER LINKAGE

CROSS-REFERENCES TO RELATED APPLICATIONS

This application is a continuation of U.S. patent application Ser. No. 17/816,668, entitled "VEHICLE WHEEL SUSPENSION SYSTEM," filed on Aug. 1, 2022; which claims the benefit of U.S. Provisional Patent Application No. 63/227,686, entitled "VEHICLE WHEEL SUSPENSION SYSTEM," filed on Jul. 30, 2021. These applications are incorporated by reference in their entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

BACKGROUND OF THE INVENTION

The present disclosure relates generally to wheel suspension systems for vehicles and more particularly to a new and improved suspension system for ground effect cars.

Many present day automobiles, and racing cars in particular, implement tires having a low profile and wide tread. During high-speed turns of the type that are common in automobile racing, lateral forces on the vehicle cause the vehicle to roll away from the turn, tilting the tires partially off the driving surface and resulting in uneven wear of the tires. This tilting and partial lifting of the tires off the driving surface causes a loss of traction and a corresponding loss of control. Furthermore, situations often arise where the tires on only one side of the race car hit a bump on the road's surface and shift upwards. With conventional independent suspension systems, this can cause a corresponding upward shift in the entire chassis of the race car and a resulting loss of traction in the opposite side tire, which can cause horrific accidents as a result.

To maximize a driver's control over a car, it is important to maximize the contact area between the car's tires and the road. In an effort to maximize traction and control, many racing cars, and Formula 1 race cars in particular, currently keep their tires set with a permanent 2.5 degree front and 1.5 degree rear negative camber-meaning that the top of their wheels are permanently angled inwards at the top towards the center of the car. While a permanent negative camber helps keep the outer tire in a more proper orientation with the road and improves grip during high speed turns, the same cannot be said for the inside tire. When encountering high-speed turns in such permanently cambered race cars, the inside tire experiences a significantly increased negative camber and reduced contact area with the road, which leads to the overheating of the inside edge of that tire. During such turns, race cars routinely experience up to five Gs of cornering force, leading to a significant amount of weight applied to the inside edge of the inside tire. In fact, during these high speed turns, a positive camber most benefits the inside tire's orientation with the road and grip.

In an effort to minimize the lifting of tires from the driving surface and enable race cars to corner high speed turns more quickly with minimal lifting of the tires, Formula 1 race cars in particular have begun implementing certain "ground effects" that function to force the car downwards by controlling the airflow around and under the car. To maximize ground effect, it is important to maintain a near-parallel relationship between the bottom of the car and the road and between the tires and the road. In addition to coming with its own set of problems, as discussed above, the recent incorporation of a permanent negative camber in the tires also fails to maximize ground effect-induced traction.

What is needed, then, are improvements in vehicle wheel suspension systems particularly designed for ground effect cars.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure teaches an independent wheel suspension system wherein one or more of the disadvantages noted above have been overcome. From a high level, the suspension system disclosed herein has the capability to independently adjust the camber of the tires and keep the vehicle fully grounded such that the tires maintain full width contact with the road and the bottom of the vehicle remains near parallel to the road at all times.

In one embodiment, the suspension system can include first and second wheel-supporting uprights having several new and improved inwardly extending linkage systems that connect both uprights to each other and to specific positions along the vehicle chassis. The suspension system may further include a cambering system that is capable of providing a variable amount of induced camber for a given degree of chassis roll. The amount of induced camber can be adjusted by varying the angle of connection between the upright and a camber link and varying the angle of connection between the upright and a radius rod. The suspension system may further include a reactive springing/dampening system that enables the suspension to push down on one wheel when the opposing wheel shifts upwards, so as to maintain maximum contact area and downward load between the vehicle and the road.

Another aspect of the disclosure is a roll-controlling weight transfer system including a set of weight transfer links having a unique springing and shock system attached thereon, effectively enabling the suspension to selectively control how much the vehicle chassis rolls and how much resistance to roll (weight transfer) is applied at either end of the vehicle.

Yet another aspect of the disclosure is a method of steering a vehicle having the independent wheel suspension system disclosed herein by using a steering box and a pivot arm.

Another aspect of the disclosure is a wheel suspension system for a vehicle having a chassis. The wheel suspension system may include first and second wheel uprights located on opposing sides of the chassis. The wheel suspension system may include an axis arm system. The axis arm system may include an axis arm weldment mounted to the chassis on a pivot point. The axis arm weldment may include a first side and a second side disposed opposite the first side. The axis arm system may include a first axis arm extending away from the first side of the axis arm weldment and pivotably attached to the first wheel upright. The axis arm system may include a second axis arm extending away from the second side of the axis arm weldment and pivotably attached to the second wheel upright. The wheel suspension system may include a cambering system. The cambering system may include a first camber link including a first end and a second end. The first end may pivotably attach to the first wheel upright and the second end may pivotably attach to the second side of the axis arm weldment. The cambering system may include a second camber link including a first end and a second end. The first end may pivotably attach to the second wheel upright and the second end may pivotably attach to the first side of the axis arm weldment.

Another aspect of the disclosure is another wheel suspension system for a vehicle having a chassis. The wheel suspension system may include first and second wheel uprights located on opposing sides of the chassis. Each wheel upright may have an upper pickup point, a lower pickup point, and a wheel mounting axle means thereon. The wheel suspension system may include an axis arm weldment including a main structure and an integrated camber link mounting structure. The main structure may include an opposing pair of main axis arms. The integrated camber link mounting structure may include an opposing pair of integrated axis arms. The main structure and the integrated camber link mounting structure may both be mounted to the chassis on an inline or closely corresponding pivot point corresponding to a roll center. The opposing pair of main axis arms may each be pivotally attached at their outer ends to the upper pickup point of the respective wheel upright. The wheel suspension system may include a cambering system. The cambering system may include first and second camber links. Each camber link may be pivotably attached at a first end to one of the integrated axis arms and pivotably attached at a second end to the lower pickup point of an opposite side wheel upright. The cambering system may include first and second radius rods, each pivotably attached at a first end to the chassis for pivotal movement about a fore and aft axis and pivotably attached at a second end to the lower pickup point of the respective wheel upright, such that the radius rods induce camber into the wheel uprights when the chassis rolls around the roll center.

Another aspect of the disclosure is wheel suspension system for a vehicle having a chassis. The system may include first and second wheel uprights located on opposing sides of the chassis. Each wheel upright may include an upper pickup point, a lower pickup point, and a wheel mounting axle means thereon. The system may include an axis arm weldment. The axis arm weldment may include a main structure and an integrated camber link mounting structure. The main structure may include an opposing pair of axis arms. The integrated camber link mounting structure may include an opposing pair of integrated axis arms. The main structure and the integrated camber link mounting structure may both mount to the chassis on an inline or closely corresponding pivot point corresponding to a roll center. The opposing pair of axis arms may each pivotally attach at their outer ends to the upper pickup point of the respective wheel upright. The wheel suspension system may further include a springing system. The springing system may include a spring shock having a left and right end. Each of the left and right end may connect to a spring lever. Each spring lever may pivotably attach to the same side axis arm and may include a tension link mounted thereon. The tension link may connect the spring levers to the opposite side axis arms such that an upward movement of one of the axis arms may force the tension link connected to the opposite side spring lever to compress the spring shock and may cause a corresponding downward movement of the opposing main axis arm. The wheel suspension system may further include a cambering system. The cambering system may include first and second camber links. Each camber link may pivotably attach at a first end to one of the integrated axis arms and may pivotably attach at a second end to the lower pickup point of an opposite side wheel upright. The cambering system may further include first and second radius rods. Each radius rod may pivotably attach at a first end to the chassis for pivotal movement about a fore and aft axis and may pivotably attach at a second end to the lower pickup point of the respective wheel upright such that the radius rods may induce camber into the wheel uprights when the chassis rolls around the roll center. Each of the first and second radius rods may be non-parallel to the ground.

Another aspect of the disclosure includes a weight transfer system for a vehicle having a chassis. The weight transfer system may include a pair of wheel uprights located on opposing sides of the chassis. The system may include a pair of weight transfer links. The weight transfer links may be located on the opposing sides of the chassis. Each weight transfer link may be disposed between the chassis and a corresponding wheel upright of the pair of wheel uprights. Each weight transfer link may include a rod, including a first end and a second end disposed opposite the first end, and an attached springing shock (e.g., dampener) disposed on the first end of the rod. The attached springing shock of each weight transfer link may pivotably attach to a chassis pickup point on the chassis. The second end of the rod of each weight transfer link may pivotably attach to its corresponding wheel upright.

Another aspect of the disclosure is a springing shock. The springing shock may include a main shock housing. The springing shock may include a main shock shaft extending from the main shock housing. The springing shock may include a secondary shock shaft. The springing shock may include a secondary shock housing disposed around the secondary shock shaft. The springing shock may include a sliding double spring retainer. The main shock housing may be configured to slideably insert into the sliding double spring retainer. The springing shock may include at least one spring disposed around the main shock housing.

Another aspect of the disclosure is another weight transfer system for a vehicle having a chassis. The weight transfer system may include a pair of wheel uprights located on opposing sides of the chassis. The weight transfer system may include a pair of weight transfer links located on the opposing sides of the chassis. The pair of weight transfer links may include a left-side weight transfer link disposed on the left side of the chassis and a right-side weight transfer link disposed on the right side of the chassis. Each weight transfer link may be disposed between the chassis and a corresponding wheel upright of the pair of wheel uprights. Each weight transfer link may include a rod, including a first end and a second end disposed opposite the first end, and an attached springing shock disposed on the first end of the rod. The attached springing shock may include a main shock housing, a main shock shaft extending from the main shock housing, a secondary shock shaft, a secondary shock housing disposed around the secondary shock shaft, a sliding double spring retainer, and at least one spring disposed around the main shock housing. The main shock housing may be configured to slideably insert into the sliding double spring retainer. The attached springing shock of each weight transfer link may pivotably attach to a chassis pickup point on the chassis. The second end of the rod of each weight transfer link may pivotably attach to its corresponding wheel upright.

Numerous other objects, advantages and features of the present disclosure will be readily apparent to those of skill in the art upon a review of the following drawings and description of a preferred embodiment.

BRIEF DESCRIPTION OF THE DRAWINGS

FIGS. 1A and 1B are a top view and a front view, respectively, of an exemplary embodiment of the vehicle suspension system in connection with the left side of the vehicle and a center chassis, wherein the tubular components of the system are shaded.

FIGS. 3A and 3B are a top view and a front view, respectively, of the exemplary embodiment of a vehicle suspension system, wherein an embodiment of the Integrated Camber Link Mounting Structure of the internal Axis Arm Weldment has been shaded.

FIGS. 4A and 4B are a top view and a front view, respectively, of the exemplary embodiment of a vehicle suspension system, wherein an embodiment of an internal Variable Cambering System has been shaded.

FIGS. 6A and 6B are a top view and a front view, respectively, of the exemplary embodiment of a vehicle suspension system, wherein an embodiment of an internal Roll-Controlling Weight Transfer System have been shaded.

FIGS. 7A and 7B are a top view and a front view, respectively, of an exemplary embodiment of a vehicle suspension system, wherein an embodiment of a Steering System has been shaded.

DETAILED DESCRIPTION

Figure 2A:
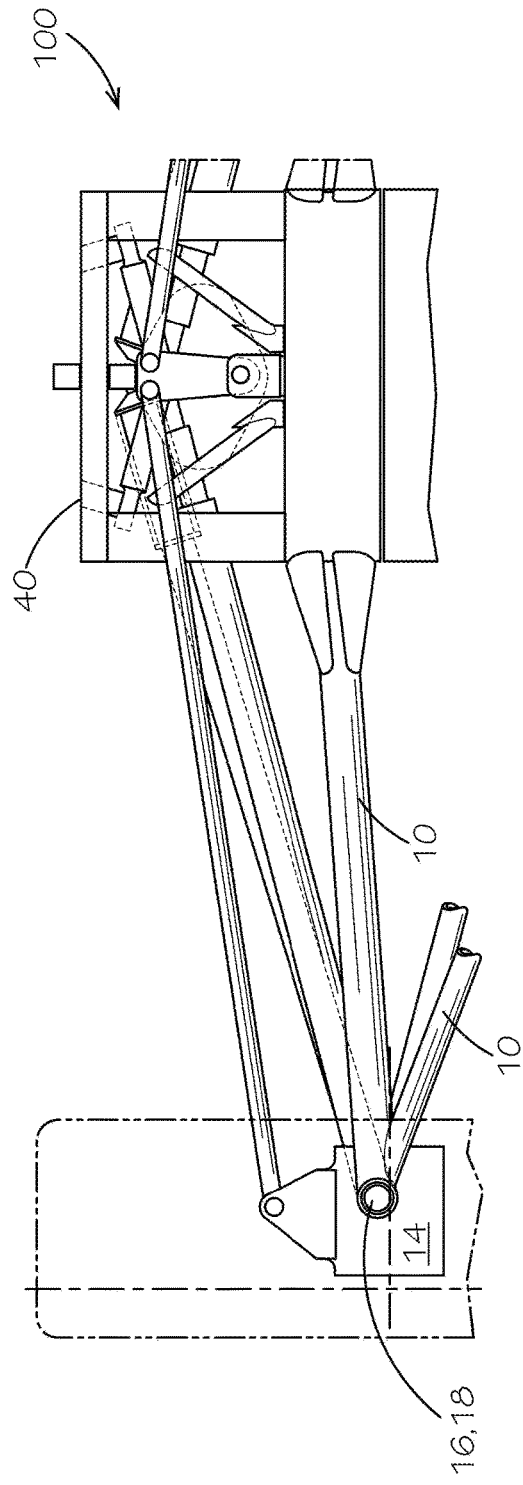
FIGS. 2A and 2B are a top view and a front view, respectively, of the exemplary embodiment of a vehicle suspension system, wherein an embodiment of an internal Axis Arm Weldment has been shaded.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(n)" where n may include a number. Referring to one of the elements as "Element 102" refers to any single element of the Elements 102(1)-(n). Additionally, referring to different elements "First Elements 102(1)-(n)" and "Second Elements 104(1)-(n)" does not necessarily mean that there must be the same number of First Elements as Second Elements and is equivalent to "First Elements 102(1)-(n) and "Second Elements (1)-(m)" where m is a number that may be the same or may be a different number than n.

FIG. 1A and FIG. 1B respectively show a top-down view and a front view (as would be viewed from the driver's seat of such a vehicle) of an exemplary embodiment of the left side of an independent wheel suspension system 100. The system 100 may include a chassis 12. The system 100 may include an opposing set of wheel uprights 14 journaled on corresponding wheel axles 26. These two wheel uprights 14 may be located on opposing sides of the chassis 12 from each other. Each upright 14 may include an upper pickup point 16, a lower pickup point 18, or a steering attachment 28 located thereon. Each upright 14 may include a wheel axle mounting means. The wheel axle mounting means may include an axle.

Throughout the entirety of FIGS. 1-7 detailed herein, the tire 22, wheel 24, and axle 26 shown around wheel upright 14 specifically depict those of the front left-side wheel of the vehicle, but is intended to be exemplary of the system's 100 connection to any other of that same vehicle's wheels. In an exemplary embodiment, opposing right and left wheel uprights 14 may connect to the vehicle's chassis 12 or to each other by a number of different linkage systems. Regarding FIG. 1B, numeral 12 indicates a vehicle chassis, and the illustration is intended to represent a relatively rigid structure including a chassis frame. Herein, the use of the term "chassis" or "frame" is intended to include the conventional chassis of an automobile, the body thereof, or any additional supports rigidly fixed thereto for purpose of accommodating the present suspension system 100.

In an exemplary embodiment, the vehicle suspension system 100 may further include an axis arm system. The axis arm system is discussed further below in relation to FIGS. 2A, 2B, 3A, and 3B. The vehicle suspension system 100 may further include a variable cambering system. The cambering system may include one or more camber links 30. The cambering system may include one or more radius rods 32. The cambering system is discussed further below in relation to FIG. 4A and FIG. 4B. The vehicle suspension system 100 may further include a springing system. The springing system may include a spring shock 34. The springing system may include a roll-controlling weight transfer system. The weight transfer system may include an opposing pair of weight transfer links 64. Each weight transfer link 64 may be connected to the chassis 12 at a weight transfer link pickup point 36. The springing system is discussed further below in relation to FIGS. 6A and 6B.

Figure 2B:
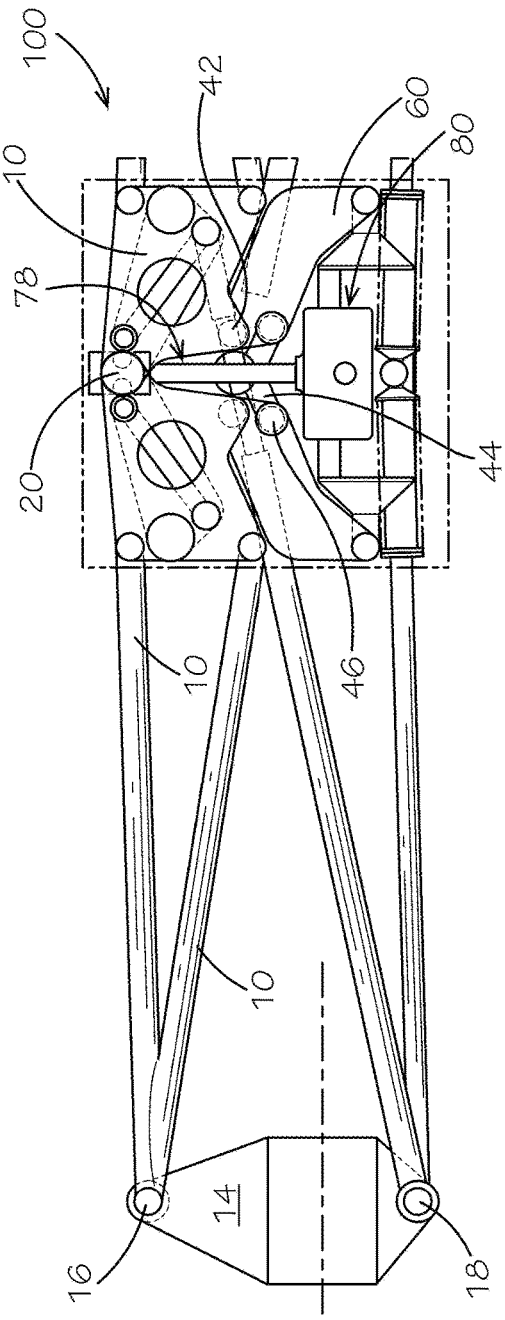

FIG. 2A and FIG. 2B depict an exemplary embodiment of an axis arm system. The axis arm system may include an axis arm weldment 40. The axis arm weldment 40 may include the main fabricated and welded primary suspension structure of vehicle suspension system 100. The axis arm weldment 40 can be further described as having a "main structure," as depicted in FIGS. 2A and 2B, and an "integrated camber link mounting structure," as shown in FIGS. 3A and 3B. A top view and a front view of an exemplary embodiment of suspension system 100 having an axis arm weldment 40 "main structure" is shown in FIGS. 2A and 2B, respectively, with the axis arm weldment "main structure" being identified as the shaded portions.

In an exemplary embodiment, the axis arm weldment 40 may include a first side and a second side. The two sides may be disposed opposite each other in relation to the chassis 12. The first side may include a left side, and the second side may include a right side. While the left side is depicted in FIG. 2A and FIG. 2B, it should be understood that the right side will have a similar configuration. For example, as discussed below, the axis arm weldment 40 "main structure" may include an axis arm 10. It should be understood that an axis arm 10 extending from a first side of the axis arm system may include there existing a second axis arm 10 extending from an opposite second side.

In one embodiment, the axis arm weldment 40 "main structure" and "integrated camber link mounting structure" may both be mounted on an inline pivot point, which may be located at the chassis roll center 20. In some embodiments, the axis arm weldment 40 "main structure" and "integrated camber link mounting structure" may be mounted closely together to create a virtual roll center. In certain embodiments, one or more components of the axis arm weldment 40 (e.g., one or more main axis arms 10, one or more integrated axis arms 49, or some other component) may mount to the axis arm weldment 40 at separate pivot points.

A pivot point may be disposed above a center of mass of the vehicle. The axis arm weldment 40 "main structure" may include an axis arm 10 extending away from the axis arm weldment 40. The outer end of the axis arm 10 (i.e., the end of the axis arm 10 not disposed on the axis arm weldment 40 "main structure") may be pivotably attached to a wheel upright 14. The axis arm 10 may be pivotably attached to an upper pickup point 16 of the wheel upright 14. In certain embodiments, the main axis arm 10 may pivot about the roll center 20. In some embodiments, the main axis arm 10 may pivot about a virtual roll center or another pivot point in response to the axis arms 10 being mounted separately next to each other.

Figure 5A:
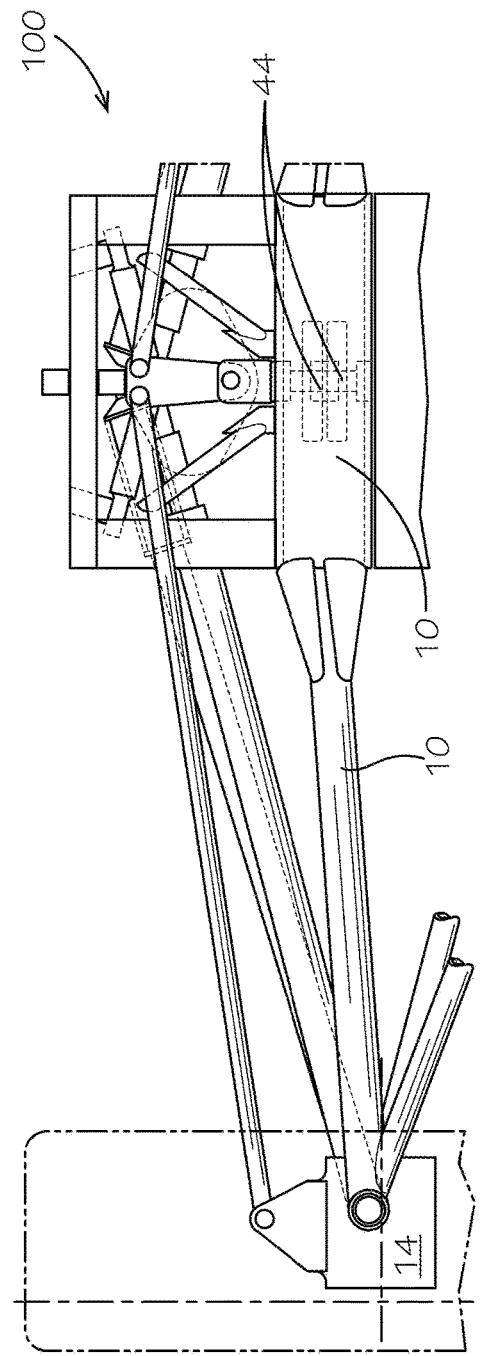
FIGS. 5A and 5B are a top view and a front view, respectively, of the exemplary embodiment of a vehicle suspension system, wherein an embodiment of an internal Springing System has been shaded.
Figure 5B:
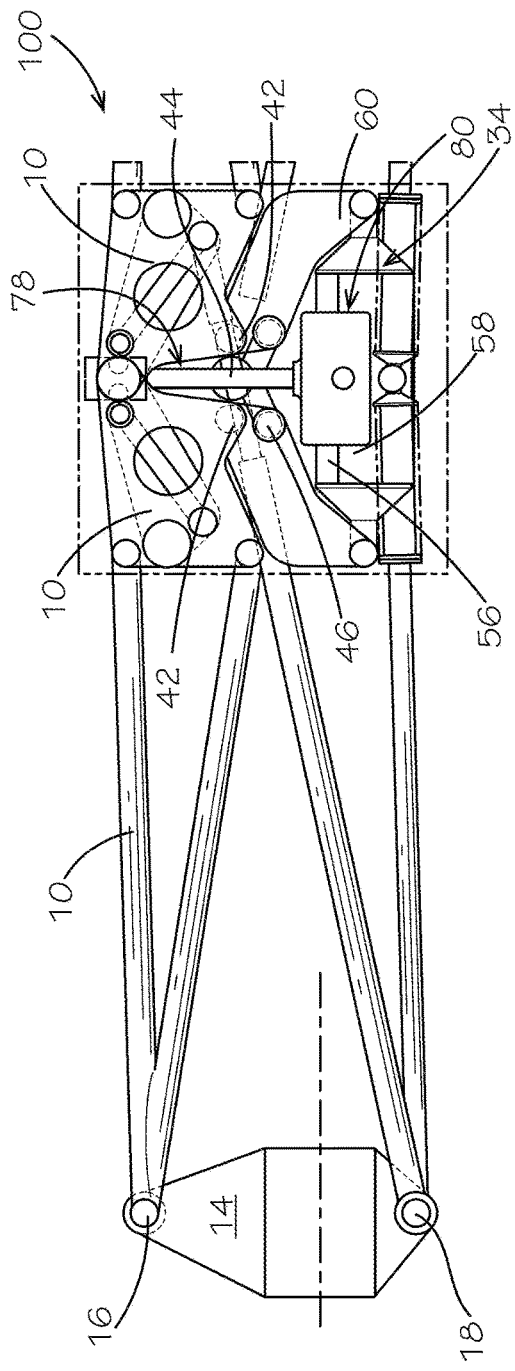
Figure 8A:
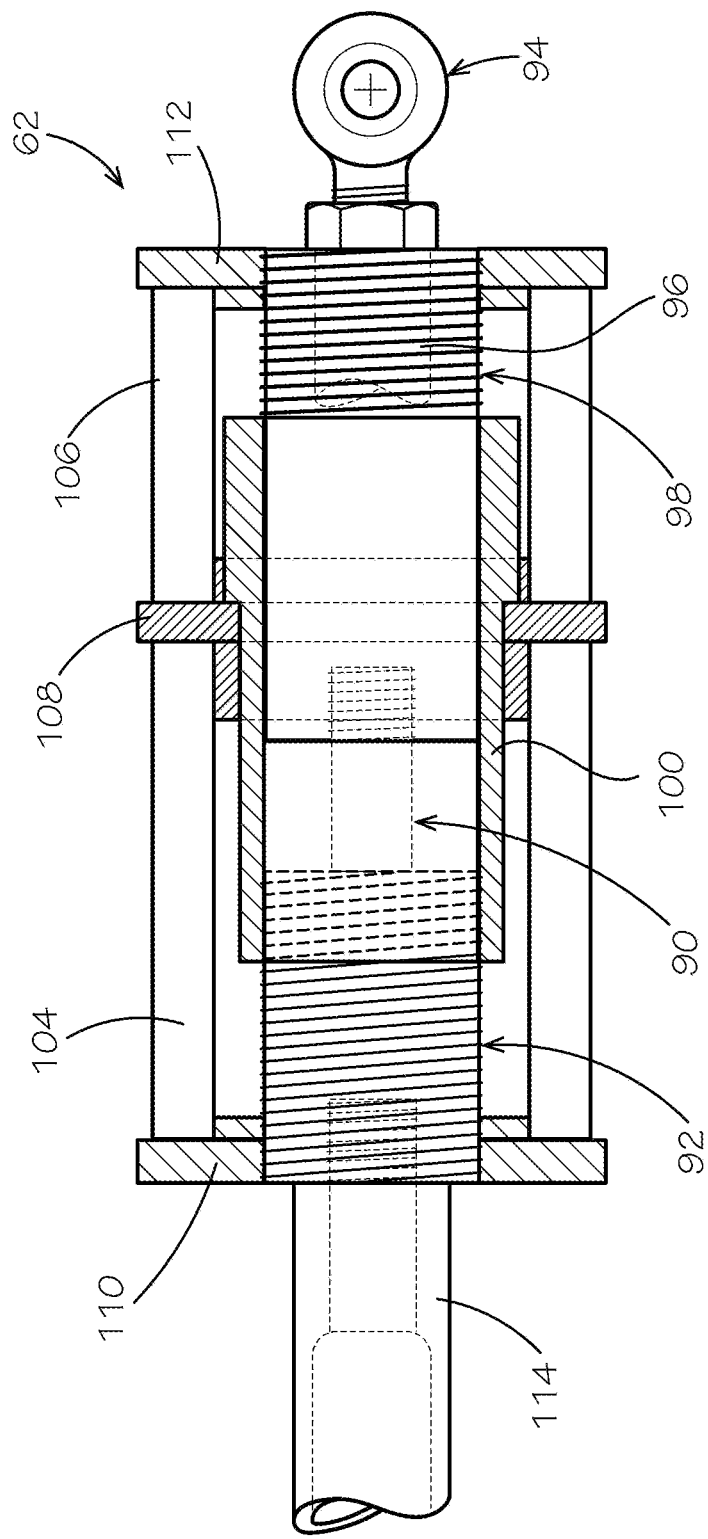
FIGS. 8A through 8G are sectional side views of the same exemplary embodiment of a Springing Shock component of the internal Roll-Controlling Weight Transfer System.
Figure 8B:
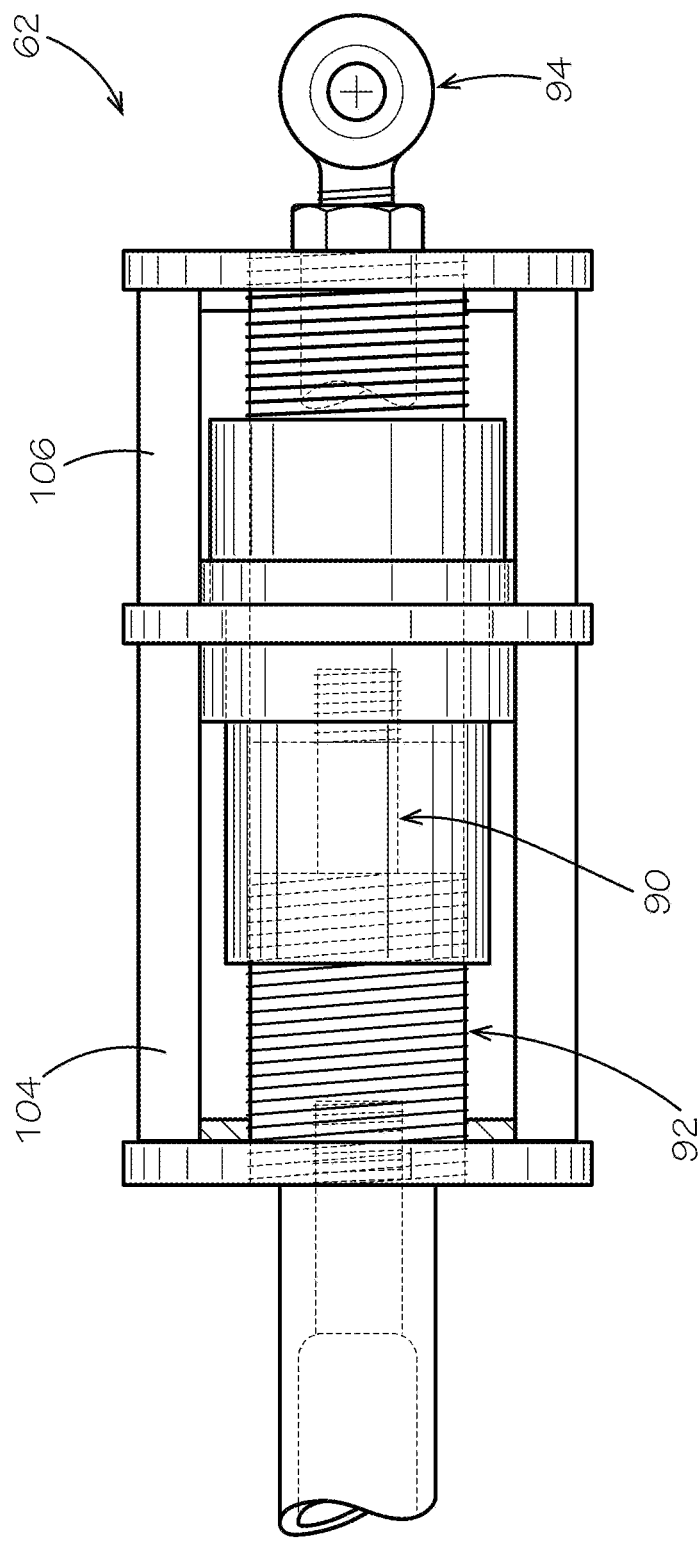
Figure 8C:
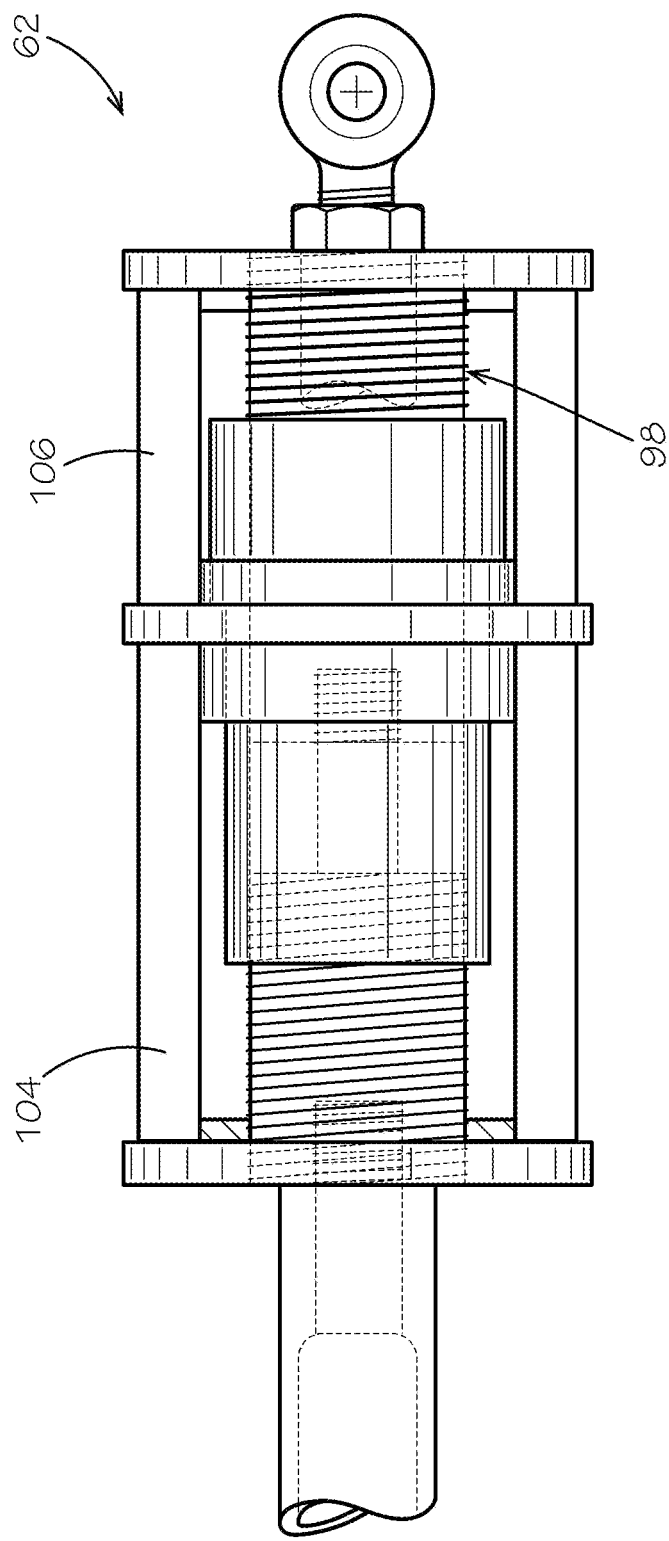
Figure 8D:
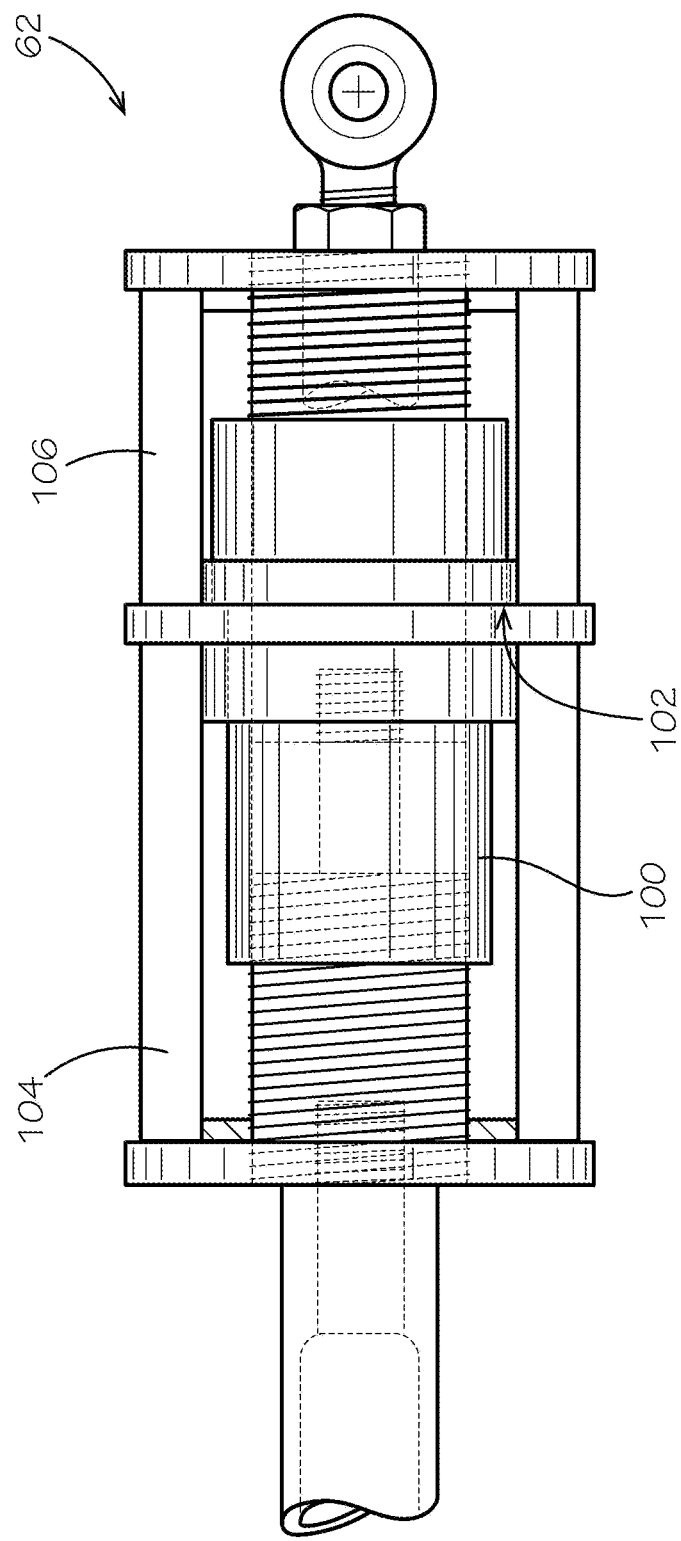
Figure 8E:
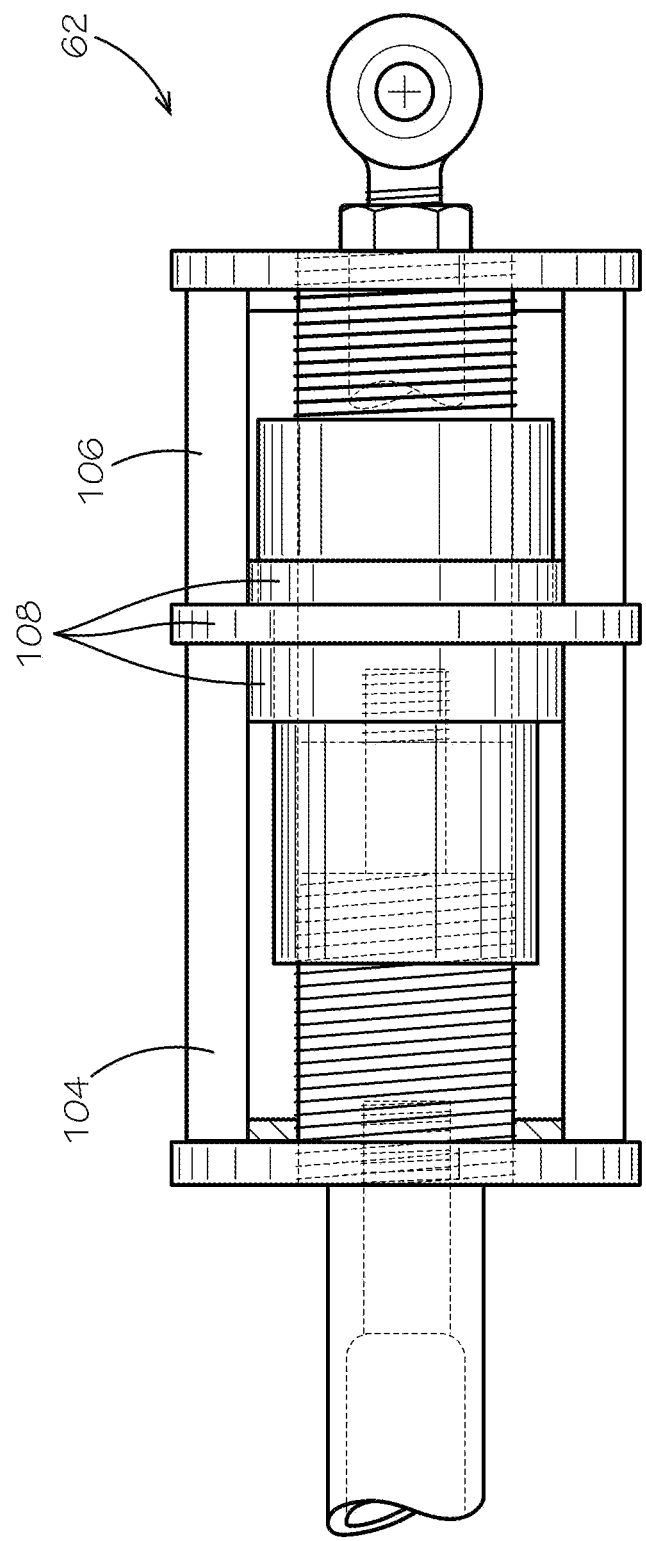
Figure 8F:
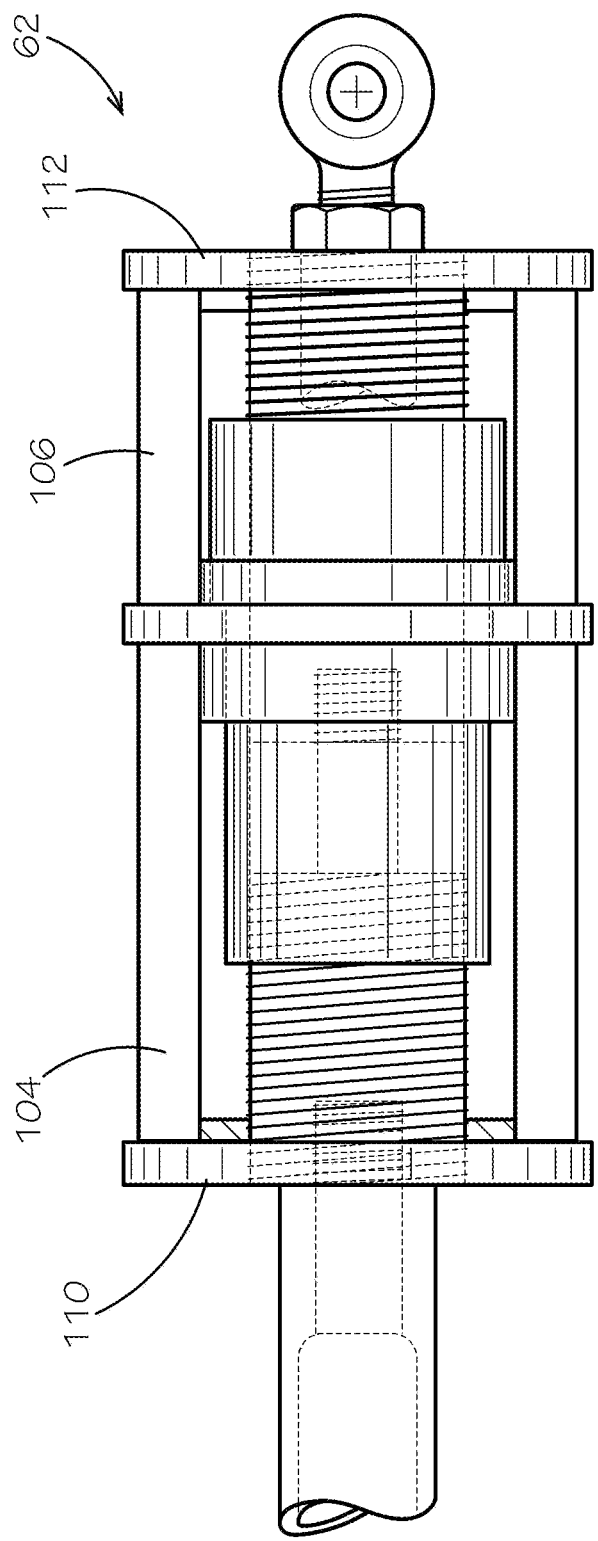
Figure 8G:
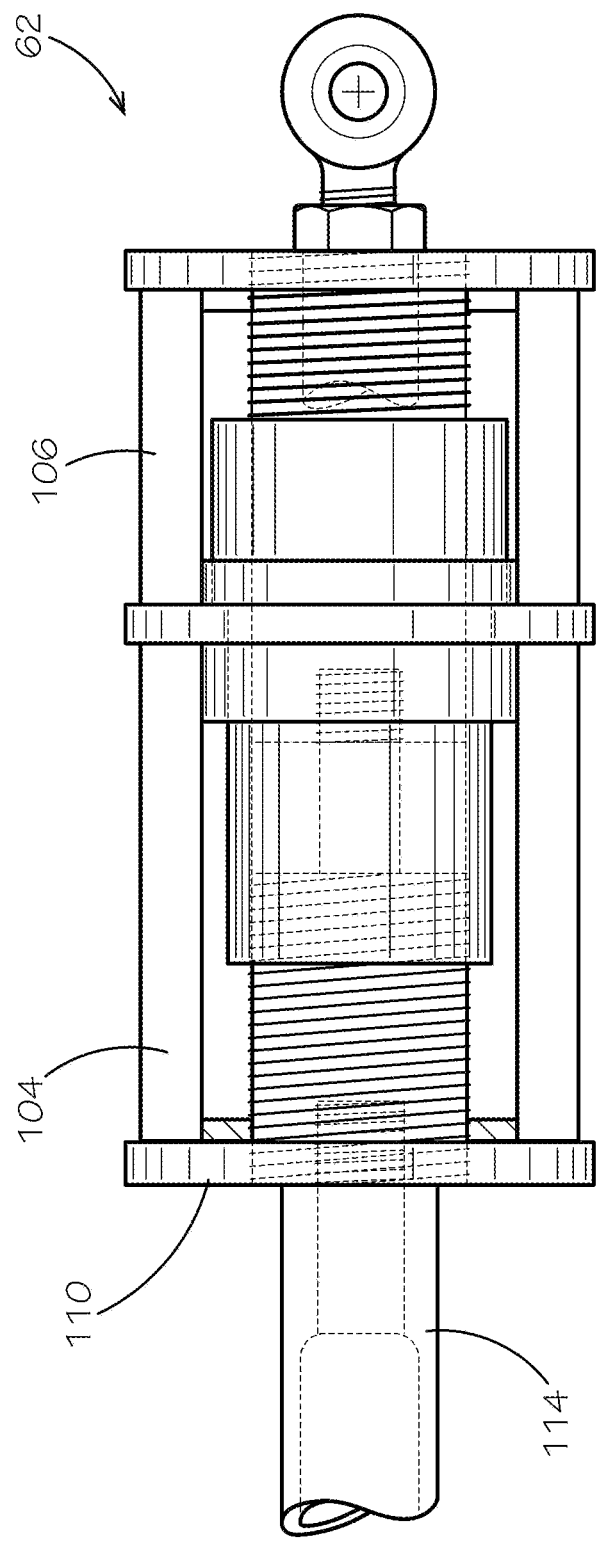

In an exemplary embodiment, the "main structure" of the axis arm weldment 40 may be primarily responsible for interfacing with and enabling the internal springing system of suspension system 100 (depicted in FIGS. 5A and 5B). As such, the axis arm system may include one or more spring levers 60. The one or more spring levers 60 may be connected to the axis arm weldment 40. The one or more spring levers 60 may include a first spring lever 60 disposed on a first side of the axis arm weldment 40. The first side may include the side of the axis arm weldment 40 from which a first axis arm 10 extends. The one or more spring levers 60 may further include a second spring lever 60 disposed on a second side of the axis arm weldment 40. The second side may be opposite the first side.

In certain embodiments, the axis arm system may include a first tension link 44. The first tension link 44 may be connected to the first axis arm 10 at a first connection point 42 and to the second spring lever 60 at a first spring lever pickup point 46. A second tension link 44 may connect to the second axis arm 10 at a second connection point 42 and to the first spring lever 60 at a second spring lever pickup point 46. As such, a tension link 44 attached to an axis arm 10 at a connection point 42 may interface with the opposing side spring lever 60 of the internal springing system at a spring lever pickup points 46. The main axis arms 10 may also attach to a spring lever 60 of the same side at the connection point 42. Thus, the connection point 42 may serve dual purposes by (1) directly connecting main axis arm 10 to the spring lever 60 of the same side, and (2) indirectly connecting main axis arm 10 to the spring lever 60 of the opposing side via tension link 44. The internal springing system of the vehicle suspension system 100 will be discussed in greater detail below.

FIG. 3A and FIG. 3B depict an exemplary embodiment of an "integrated camber link mounting structure" of the axis arm weldment 40. The "integrated camber link mounting structure" of the axis arm weldment 40 may include an opposing pair of integrated axis arms 49. The "integrated camber link mounting structure" may be primarily responsible for interfacing with and enabling the variable cambering system. As such, one or more pickup points 48 may be provided on each of the opposing integrated axis arms 49 for connecting to the camber links 30 of the variable cambering system integral to suspension system 100. Once connected to the camber links 30 at the pickup point 48, the integrated axis arms 49 may pivot about a pivot point on the chassis 12 during the induction of camber into wheel uprights 14. The pivot point may include a central pivot point on the chassis, i.e., the roll center 20.

As shown in FIG. 2A, in some embodiments, the axis arms 10 connect to the axis arm weldment 40 at an aft portion of the axis arm weldment 40. The aft portion may include a portion towards the rear of the axis arm weldment 40 (similar to what is shown in FIG. 2A). However, in one embodiment, the axis arms 10 may connect to the axis arm weldment 40 in a middle portion of the axis arm weldment 40 or in a fore portion of the axis arm weldment 40. The fore portion of the axis arm weldment 40 may include a portion toward the front of the axis arm weldment 40.

FIG. 4A and FIG. 4B depict one embodiment of the cambering system of the vehicle suspension system 100. Although FIG. 4A and FIG. 4B depict a left side of the cambering system, it should be understood that the right side will include a similar configuration. In one embodiment, the cambering system may include a first camber link 30 and a second camber link 30. As can be seen from FIG. 4A and FIG. 4B, a camber link 30 may include a first end and a second end. The first end may pivotably attach to a wheel upright 14. The opposite, second end may pivotably attach to the opposite side of the axis arm weldment 40. For example, in one embodiment, the camber link 30 may connect at one end at the lower pickup point 18 of the upright 14 and at a second end at an integrated axis arm pickup point 48 on the opposite side of the axis arm weldment 40.

Because the camber links 30 connect to the opposite side of the axis arm weldment 40, the camber links 30 may cross or overlap each other. Thus, in some embodiments, the first camber link 30 may include a cutout through which the second camber link 30 may extend. The cutout may include an aperture disposed in a portion of the first camber link 30.

In one embodiment, the vehicle suspension system 100 may include one or more radius rods 32. For example, the suspension system 100 may include a first radius rod 32 disposed on one side of the chassis 12 and a second radius rod 32 disposed on an opposite side of the chassis 12. One end of a radius rod 32 may pivotably attach to the lower pickup point 18 of the upright 14. The radius rod's 32 other end may attach to the chassis 12 or to the axis arm weldment 40. The plan view width 50 may be equal to that of the axis arm 10.

In one embodiment, a radius rod 32 attaching to the chassis 12 may include the radius rod 32 pivotably attaching to the chassis 12 for pivotal movement about a fore and aft axis. In such an arrangement, the radius rod may induce camber into the upright 14 in response to the chassis 12 rolling about the roll center 20. In the example embodiment of FIG. 4A, the camber link 30 may angle rearward from the pickup point 48 on the opposite-side integrated axis arm 49 by 15 degrees, but can vary anywhere from 10 to 30 degrees. Thus, in some embodiments, a plan view angle of the connection between the camber link 30 and the rearward pickup point 48 may be adjustable. The adjustable angle may enable the adjustment of an amount of camber induced for a given degree of chassis 12 roll. In some embodiments, a larger angle may induce more camber than a smaller angle.

Similarly, as also seen in FIG. 4A, the radius rod 32 may angle forward at 15 degrees from its pivotal attachment on the upright 14, but can vary anywhere from 10 to 45 degrees. Thus, in some embodiments, a plan view angle of the connection between the radius rod 32 and the pivotable attachment on the upright 14 may be adjustable. The adjustable angle may enable the adjustment of an amount of camber induced for a given degree of chassis 12 roll.

Because of the angle of the camber link 30 and the angle of the radius rod 32 attached to the chassis 12, in response to the chassis 12 rolling around the roll center 20, the cambering system may induce camber into the upright 14.

As an example of the cambering system inducing camber, in response to the vehicle depicted in FIG. 4A and FIG. 4B turning to the right, the cambering system may cause the chassis 12 (whose center of mass may be disposed below the roll center 20) to roll to the left. This roll of the chassis 12 to the left would push the radius rod 32 to the left and pivot the lower pickup point 18 of the left-side upright 14 forward and outward, which may induce negative camber to the then-more loaded tire and, consequently, the opposite may occur on the lower pickup point 18 of the right-side upright 14. This action may put both tires 22 in the most advantageous relationship with the road surface for a right-hand corner by maximizing the contact area between the tires 22 and the road. By varying the angle of the camber link 30 and varying the angle of the radius rod 32, one may vary the amount of induced camber for a given degree of chassis 12 roll. In some embodiments, in order to enable the variable cambering system, one camber link 30 may pass through the other camber link 30 at a point identified by numeral 54 in FIG. 4B.

In some embodiments, a radius rod 32 may be non-parallel to the ground. For example, one end of the radius rod 32 may pivotably attach to the lower pickup point 18 of the upright 14. The radius rod's 32 other end may attach to a lower portion of the chassis 12 such that the radius rod 32 angles upward from the chassis 12. This upward angle may enable the radius rod 32 to induce a larger amount of camber than if the radius rod 32 were parallel with the ground. Other angles may also enable the radius rod to induce a larger amount of camber. For example, the other end of the radius rod 32 may attach to a higher portion of the chassis such that that radius rod angles downward. The amount of the angle may also be adjusted to induce more or less camber.

In some embodiments, the cambering system may include a removable support tube 52. The removable support tube 52 may be positioned between an axis arm 10 and an integrated axis arm 49.

FIG. 5A and FIG. 5B depict an exemplary embodiment of an internal springing system of the vehicle suspension system 100. In one embodiment, the internal springing system may include a single spring shock 34. The spring shock 34 may include one or more internal springs 56. The spring shock 34 may include a shock component 58. The spring shock 34 may be connected at its ends (e.g., a left end and a right end) to opposing spring levers 60. The spring levers 60 may be pivotably attached to the same-side main axis arms 10 at pivot points 42. Additionally, the spring levers 60 may pivotably attach to tension links 44 at pivot points 46. The tension links 44 may each connect at their other end to the opposite-side main axis arms 10 at pivot points 42. In such embodiments, the pivot points 42 may function as a pivotal connection point between spring levers 60 and the same-side axis arms 10 while also functioning as a direct attachment point between the tension links 44 and the opposing-side spring lever 60 at attachment point 46.

In some embodiments, the action of the axis arms 10 moving upward may force the tension link 44 connected to the opposite-side spring lever 60 (through its leverage on the spring lever 60) to compress the spring shock 34 at an increased ratio. For example, in such an exemplary embodiment, in response to the axis arm 10 at the upper pickup point 16 of the left upright 14 moving up by 1 inch (approx. 2.54 cm), the spring shock 34 may compress by a total of 1.1 inches (approx. 2.8 cm). In such a manner, in response to the upright 14 on only one side of the vehicle hitting a bump and being vertically displaced, through its internal springing system, the vehicle suspension system 100 may actively push down on the opposite-side upright 14, helping to achieve maximum contact area between the opposite-side tire 22 and the surface of the road.

In one embodiment, the left side spring lever 60 may attach to the left axis arm 10 at a connection point 42. One end of a tension link 44 may connect to the left side spring lever 60 at a connection point 46 while the other end of the tension link 44 may attach to the right side axis arm 10 at the attachment point 42.

FIG. 6A and FIG. 6B depict an example embodiment of a roll-controlling weight transfer system of the vehicle suspension system 100. In one embodiment, the weight transfer system may include one or more transfer links 64. The one or more transfer links 64 may include an opposing pair of weight transfer links 64.

In some embodiments, a weight transfer link 64 may include a rod or shaft. The rod may include a first end and an opposite second end. The first end may pivotably attach to the wheel upright 14. For example, the first end may pivotably attach to the lower pickup point 18 of the wheel upright 14. The second end of the rod of the weight transfer link 60 may include a springing shock 62. The springing shock 62 may be disposed on the second end of the rod. The springing shock 62 may include one or more springs 66. In one embodiment, the springing shock 62 may be attached to the rod of the weight transfer link 64. In other embodiments, the springing shock may be integral with the rod.

In one embodiment, the springing shock 62 may connect to an inner pickup point 36 on the chassis 12. The springing shock 62 may pivotably attach to the inner pickup point 36. The inner pickup point 36 may include a weight transfer pickup point. The multiple weight transfer links 64 may not necessarily connect to the chassis 12 at the same inner pickup point 36, but may be equal in length and angle as (i.e., may run parallel to) the axis arms 10. In certain embodiments, one or more weight transfer links 64 may be located in close proximity to an axis arm 10 to allow for adjusting one or more steering characteristics. In some embodiments, the inner pickup point 36 may be called the "chassis pickup point." In some embodiments, the length of a weight transfer link may include the distance between the inner pickup point 36 and the wheel upright 14 when the chassis 12 is in a static, neutral position.

A weight transfer link 64 may be capable of controlling how much the chassis 12 rolls and how much resistance to roll (weight transfer) is applied at either end of the vehicle. Attached to weight transfer link 64 may be the unique springing shock 62 which, in an exemplary embodiment, may be limited in its spring resistance by being preset so that the spring 66 may only apply force until the corresponding weight transfer link 64 is at the desired length. The desired length may include the distance from the inner pickup point 36 on chassis 12 to the lower pickup point 18 of the corresponding upright 14 so that in a static, neutral position, neither spring 66 is applying force to the neutral inner pickup point 36 on the chassis 12. In the static, neutral position, the length of the weight transfer links 64 may be equal. In one embodiment, the spring rate of the springing shock 62 may be adjustable.

As an example, when the chassis 12 begins to roll left (e.g., in response to the vehicle making a right-hand turn), only the springs 66 of the springing shock 62 attached to the left weight transfer link 64 may activate. The springs 66 of the springing shock 62 on the opposite weight transfer link 64 may be retained while the shaft of the unique system of that weight transfer link 64 may be allowed to move outward to match the opposing weight transfer link's 64 compression with virtually no dampening in that direction (normally called "rebound"). Then, in response to the chassis 12 rolling back to the static, neutral position, the shock portion of that same weight transfer link 64 may add significant dampening (normally called "bump dampening"). At the same time, the unique design of the weight transfer link 64 may allow the opposite weight transfer link 64 to add dampening (rebound dampening).

While the center line of the chassis 12 may be vertical in response to the chassis 12 being in the static, neutral position, in some embodiments, this may not be the case. In some embodiments, in order to accommodate various issues with a road surface, wind conditions, and/or load, it may be desirable to skew the center line of chassis 12 so that it may not be vertical at a static, neutral position. The skew may be achieved by adjusting the parameters of the weight transfer links 64.

In some embodiments, the springing shock 62 may include a preset limit on its springing resistance. The springing shock 62 may only be capable of applying force until the weight transfer link 64 the springing shock 62 is connected to reaches a predetermined length. The predetermined length may be the distance between the inner pickup point 36 and the upright 14 in response to the chassis 12 being in a static, neutral position. In such a position, the springing shock 62 may not apply force to the inner pickup point 36 on the chassis 12.

In certain embodiments, a plan view angle of the connection between the weight transfer link 64 and the upright 14 and a plan view angle of connection between the camber link 30 and the upright 14 may be the same angle.

FIG. 7A and FIG. 7B depict a steering system of the vehicle suspension system 100. The steering system may enable the rotation of an upright 14 about a vertical axis. The vertical axis may run through the center of the upright 14. In some embodiments, such a steering system may include a steering box 80. The steering box 80 may contain a steering shaft input 82 from a steering wheel. A pivot shaft 78 may extend from the steering box 80 and may connect to a pivot arm 72. The steering system may include an opposing pair of steering rods 70. A steering rod 70 may attach to another portion of the suspension system 100 via a steering rod pickup point 74 on one end of the steering rod 70. An opposite end of the steering rod 70 may attach to a steering attachment pickup point 28 on the corresponding upright 14. In some embodiments, the steering attachment pickup point 28 of the wheel upright 14 may be the same height as the upper pickup points 16 of the upright 14. The steering rods 70 may be equal in plan view width 50 to the main axis arms 10. In certain embodiments, the steering attachment pickup point 28 can be modified to induce desired steering characteristics. In some embodiments, the steering system may utilize rack and pinion steering with a center mounted pick up point for the steering rods 70.

FIGS. 8A-8G depict various embodiments of a springing shock 62. The springing shock 62 may include a springing double shock. The springing shock 62 may include one or more springs. The one or more springs may include a main spring 104 and a secondary spring 106. As discussed above, a springing shock 62 may be attached to one end of a weight transfer link 64.

In one embodiment, the springing shock 62 may include a main shock shaft 90, a main shock housing 92 having a threaded outer diameter, a secondary shock shaft 96, a secondary shock housing 98 having a partially threaded outer end, or a standard male rod end 94 located at the outer end of the secondary shock shaft 96. The main shock shaft 90 may extend from the main shock housing 92. The secondary shock housing 98 may be disposed around the secondary shock shaft 96. The main shock shaft 90 can include a threaded portion such that it is capable of threading into the back of secondary shock 98.

In some embodiments, the male rod end 94 may include a loop. The loop may be disposable on a chassis pickup point of a vehicle chassis. For example, the loop may pivotably attack to the inner pickup point 36. The main shock housing 92 may include a threaded aperture. The threaded aperture may be configured to receive a threaded portion of a rod of a weight transfer link 64. The threaded aperture may be configured to receive a threaded portion of an end of a lever attachment. In some embodiments, the male rod end 94 may extend from the secondary shock housing 98.

In certain embodiments, the springing shock 62 may further include a secondary shock sleeve 100 that is threaded onto the main shock housing 92 and may be responsible for guiding the secondary shock's 98 sliding movement. The secondary shock sleeve 100 may include a step 102. The step 102 may be responsible for limiting the motion of a sliding double spring retainer 108. The springing shock 62 may also include a main shock spring retainer 110 that may thread onto main shock housing 92. The main shock housing 92 may slidably insert into the sliding double spring retainer 108. The secondary shock sleeve 100 may attach to the main shock housing 92. The springing shock 62 may include a secondary shock spring retainer 112 that may thread onto secondary shock housing 98. The springing shock 62 may include an extension tube 114. The extension tube 114 may include a threaded end. The threaded end may be configured to thread into the back of main shock 92 and may be responsible for attaching to the weight transfer link 64.

Figure 9:
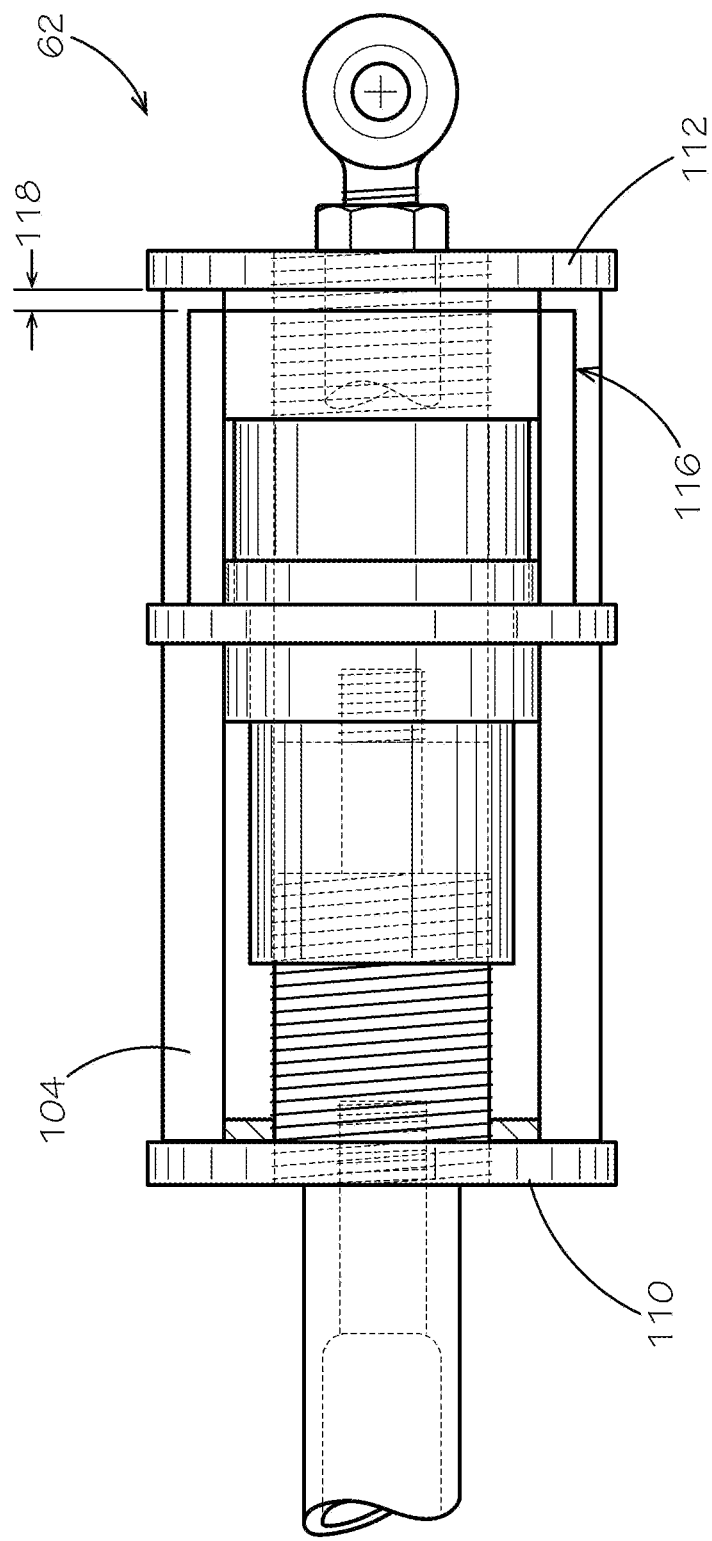
FIG. 9 is a sectional side view of another embodiment of a Springing Shock component of the internal Roll-Controlling Weight Transfer System.

FIG. 9 depicts another embodiment of a springing shock 62. This embodiment may include only a single spring arrangement, i.e., the main spring 104. In such embodiments, a special spring retainer slider 116 may be included instead of the sliding double spring retainer 108. The special spring retainer slider 116 may act as an extended version of the double spring retainer 108 that may be specifically designed to allow the other end of vehicle to engage first and to control the initial engagement at the end of the springing shock 62 where the special spring retainer slider 116 is located. Thus, in such embodiments, a gap 118 before the engagement between the secondary spring shock retainer 112 and springing retaining slider 116 may also be included.

Figure 10:
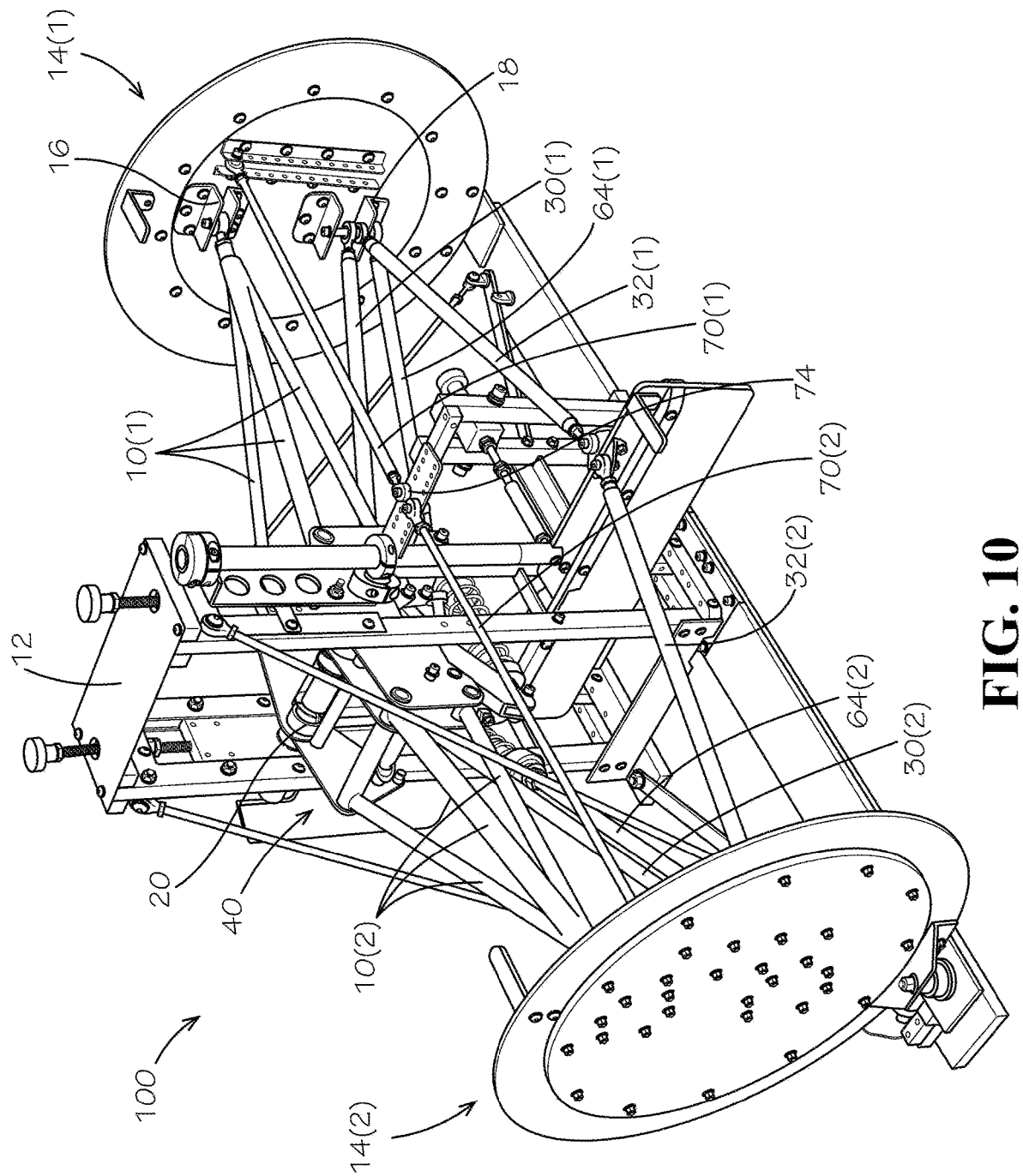
FIG. 10 is a perspective view of an exemplary embodiment of a vehicle suspension system.

FIG. 10 depicts one embodiment of a wheel suspension system 100. The wheel suspension system 100 may include many of the components of the wheel suspension system 100 described above in relation to FIGS. 1-7. The system 100 may include a chassis 12. The chassis 12 may include a right side (i.e. in FIG. 10, the side furthest from the viewer) and a left side (i.e., in FIG. 10, the side closest to the viewer). The system 100 may include a first wheel upright 14(1) disposed on the right side of the chassis 12. The first wheel upright 14(1) may include an upper pickup point 16 and a lower pickup point 18. The system 100 may include a second wheel upright 14(2) disposed on the left side of the chassis 12. The second wheel upright 14(2) may also include upper and lower pickup points (not depicted in FIG. 10).

The system 100 may include a first set of axis arms 10(1). The first set of axis arms 10(1) may be disposed on a right side of the chassis 12. The system 100 may include a second set of axis arms 10(2) disposed on a left side of the chassis 12. The respective axis arm 10(1)-(2) sets may connect the axis arm weldment 40 to the respective upper pickup points 16 of the respective wheel uprights 14(1)-(2). The axis arm weldment 40 may pivot about the chassis roll center 20. As can be seen, an axis arm 10 of the embodiment depicted in FIG. 10 may differ from the embodiment depicted in FIGS. 2A-B in that the axis arm 10 disposed furthest toward the front of the chassis 12 is angled back further than the angle in FIGS. 2A-B.

The system 100 may include a first camber link 30(1) disposed on the right side of the chassis 12. The system 100 may include a second camber link 30(2) disposed on the left side of the chassis 12. The first camber link 30(1) and the second camber link 30(2) may each pivotably attach to a respective pickup point 48 on the opposite-side integrated axis arm 49 and to the lower pickup point 18 of their respective wheel upright 14(1)-(2). The system 100 may include a first radius rod 32(1) disposed on the right side of the chassis 12. The system 100 may include a second radius rod 32(2) disposed on the left side of the chassis 12. The first radius rod 32(1) and the second radius rod 32(2) may each pivotably attach to the chassis 12 and to a lower pickup point 18 of their respective wheel upright 14(1)-(2).

In some embodiments, the system 100 may include a first steering rod 70(1) disposed on the right side of the chassis 12. The system 100 may include a second steering rod 70(2) disposed on the left side of the chassis 12. The first steering rod 70(1) and the second steering rod 70(2) may each connect to a steering rod pickup point 74 on the chassis 12 and a steering attachment pickup point 28 on the wheel upright 14(1)-(2). The system 100 may include a first weight transfer link 64(1) disposed on the right side of the chassis 12. The system 100 may also include a second weight transfer link 64(2) disposed on the left side of the chassis 12. The first weight transfer link 64(1) and the second weight transfer link 64(2) may each pivotably attach to a lower pickup point 18 on their respective wheel uprights 14(1)-(2).

Figure 11:
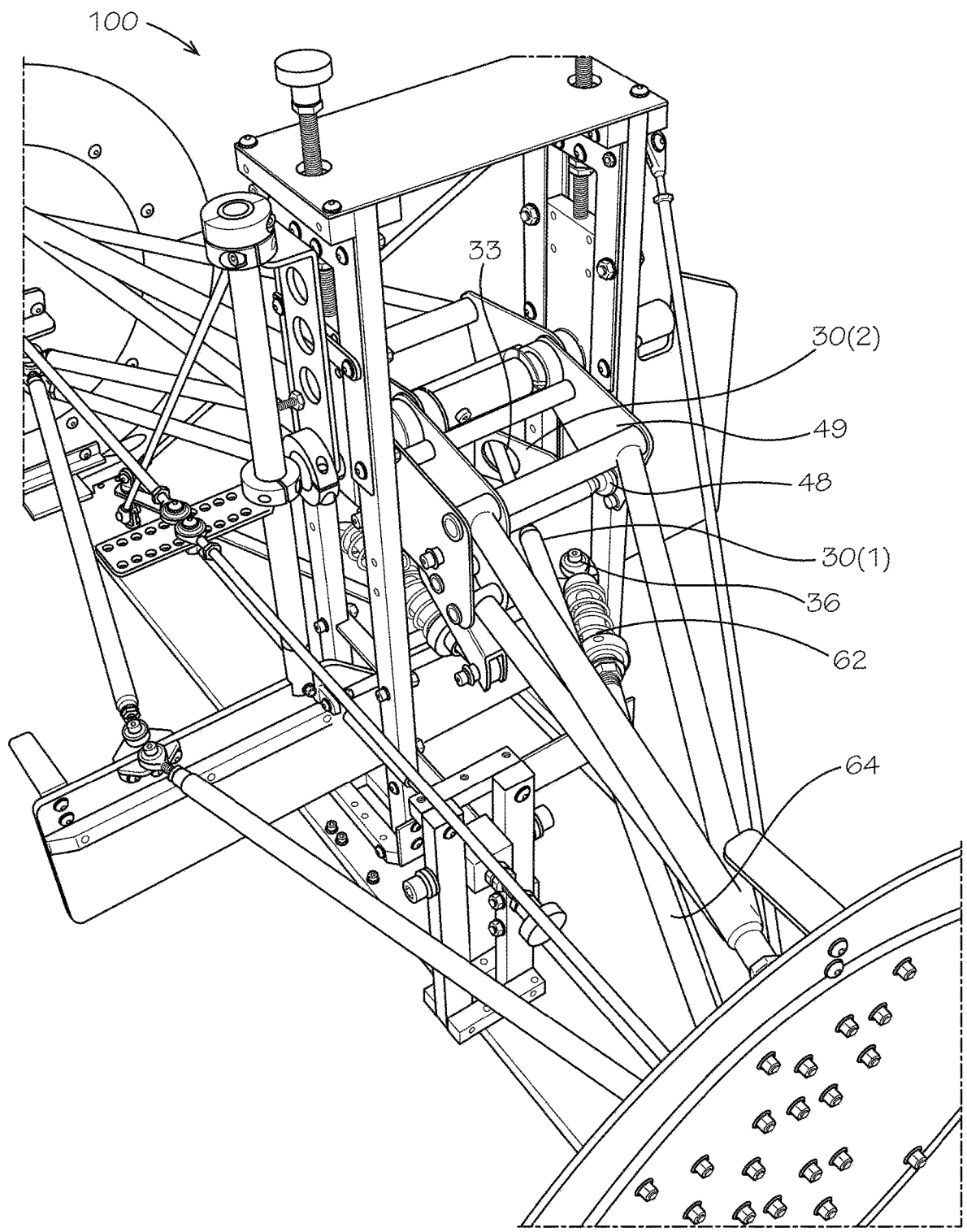
FIG. 11 is another perspective view of the exemplary embodiment of a vehicle suspension system of FIG. 10.

FIG. 11 depicts one embodiment of a wheel suspension system 100. The FIG. 11 depicts a close-up view of a portion of the system 100 depicted in FIG. 10. As can be seen in FIG. 11, in some embodiments, the second camber link 30(2) may include a cutout 33 disposed in the second camber link 30(2). The cutout 33 may include an aperture or other space through which the first camber link 30(1) may pass through. The cutout 33 may include sufficient space such that the angle of the first camber link 30(1) or the second camber link 30(2) can be adjusted and the first camber link 30(1) can still pass through the cutout 33 without obstructing or interfering with the second camber link 30(2). In some embodiments, the first camber link 30(1) may include the cutout 33.

In some embodiments, the system 100 may include the weight transfer link 64. As can be seen from FIG. 11, the weight transfer link 64 may include a rod and the end of the rod disposed toward the chassis 12 may include a springing shock 62. The springing shock 62 may pivotably attach to the weight transfer link pickup point 36 disposed on the chassis 12.

Figure 12:
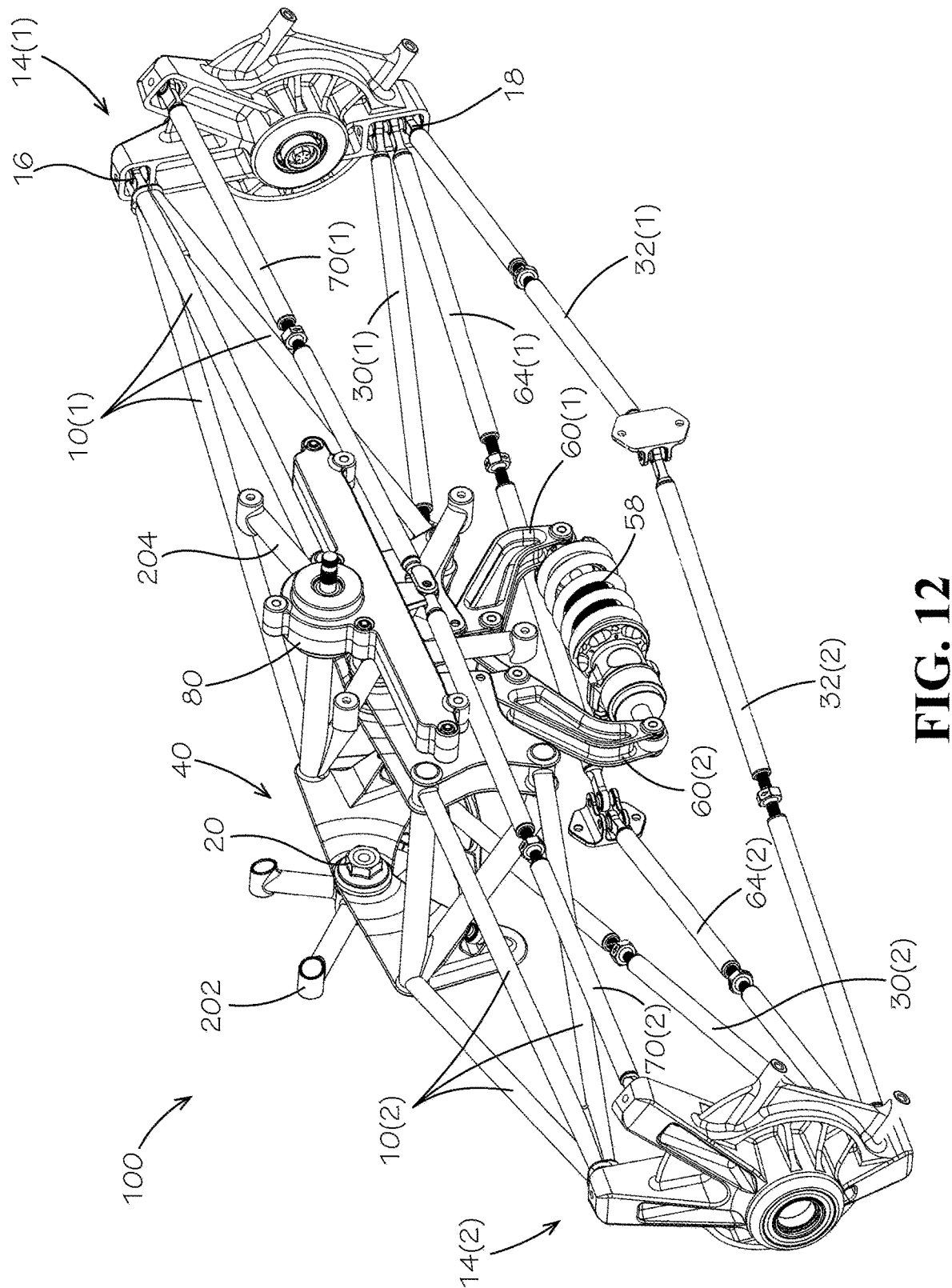
FIG. 12 is another perspective view of an exemplary embodiment of a vehicle suspension system.

FIG. 12 depicts another embodiment of the wheel suspension system 100. The system 100 may include several components discussed herein, including one or more axis arms 10(1), 10(2), one or more wheel uprights 14(1)-(2) with their respective upper pickup points 16 and lower pickup points 18, the roll center 20, one or more camber links 30(1), 30(2), one or more radius rods 32(1), 32(2), the axis arm weldment 40, the shock component 58, one or more spring levers 60(1), 60(2), one or more weight transfer links 64(1), 64(2), one or more steering rods 70(1), 70(2), or a steering box 80.

As can be seen from FIG. 12 in some embodiments, certain rods, arms, links may include multiple rods or other elongated pieces joined by a length-adjusting component. For example, as seen in FIG. 12, a camber link 30, radius rod 32, a weight transfer link 64, or a steering rod 70 may be made of two or more rods joined by a length-adjusting component. The length-adjusting component may include a turnbuckle, stretching screw, bottle-screw, or other length-adjusting components. The length-adjusting component may allow a user to lengthen or shorten the attached rod, arm, link, etc. In some embodiments, an axis arm 10 or a tension link 44 may include a length-adjusting component.

As shown in FIG. 12, the system 100 may include a forward mounting structure 202. The forward mounting structure 202 may attach to the axis arm weldment 40 and may attach the system 100 to the chassis 12. In some embodiments, the forward mounting structure 202 may include an X-shaped structure that may pivotably connect to the axis arm weldment 40. The forward mounting structure 202 may be mounted to a front portion of the axis arm weldment 40. Similarly, the system 100 may include a rear mounting structure 204. The rear mounting structure 204 may be similar to the forward mounting structure 204 except that it may attach to a rear portion of the axis arm weldment 40.

Figure 13:
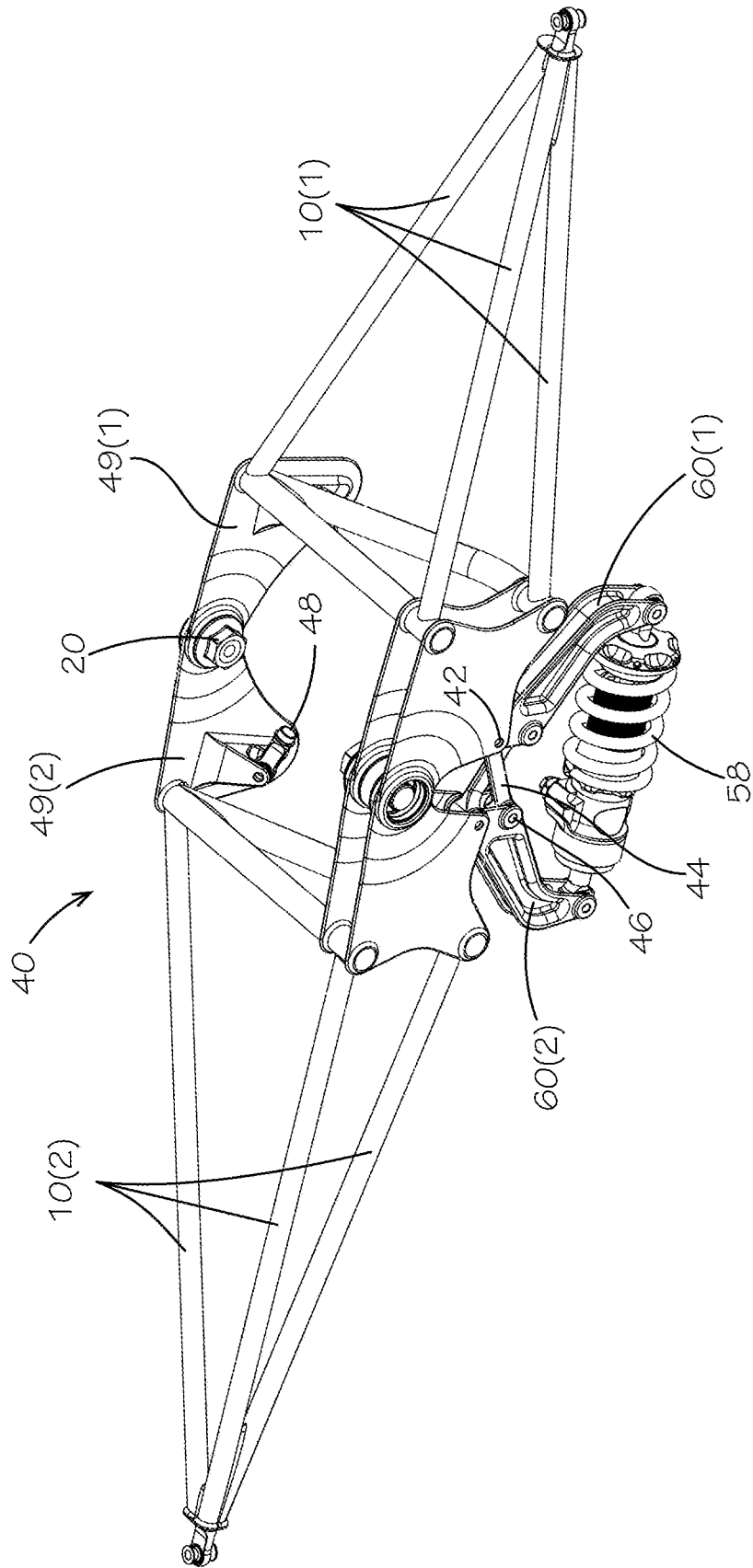
FIG. 13 is another perspective view of an exemplary embodiment of a vehicle suspension system.
Figure 14:
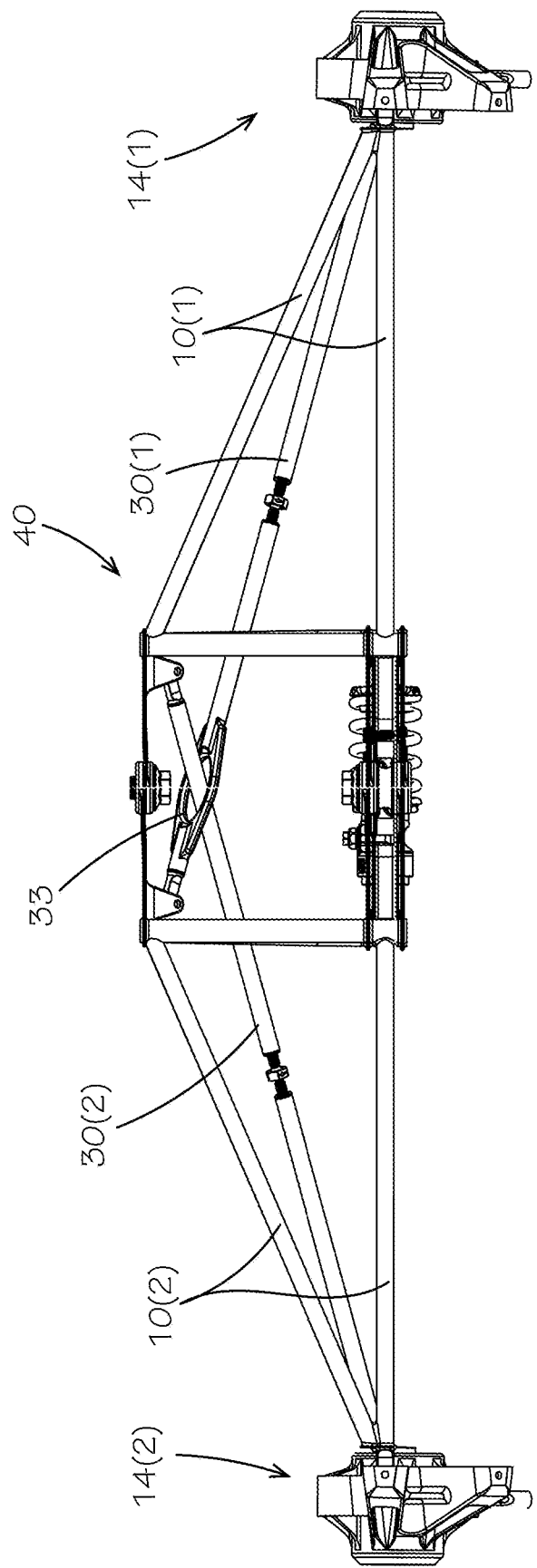
FIG. 14 is top-down perspective view of an exemplary embodiment of a vehicle suspension system.

FIG. 13 depicts one embodiment of the axis arm weldment 40 with various related or connected components. For example, FIG. 13 depicts the right axis arms 10(1), the left axis arms 10(2), the roll center 20, a right integrated axis arm 49(1), a left integrated axis arm 49(2), the shock component 58, a right spring lever 60(1), and a left spring lever 60(2). The system 100 includes the first connection point 42, which connects to an opposite side spring lever pickup point 46 via a tension link 44. Although FIG. 13 only labels one set of connection points 42, spring lever pickup points 46, and tension links 44, it should be understood that a similar structure may apply to corresponding connection points 42, spring lever pickup points 46, and tension links 44 on the other side. FIG. 14 depicts one embodiment of the right and left camber links 30(1)-(2) where the left camber link 30(2) passes through the right camber link 30(1) via a cutout 33.

Figure 15:
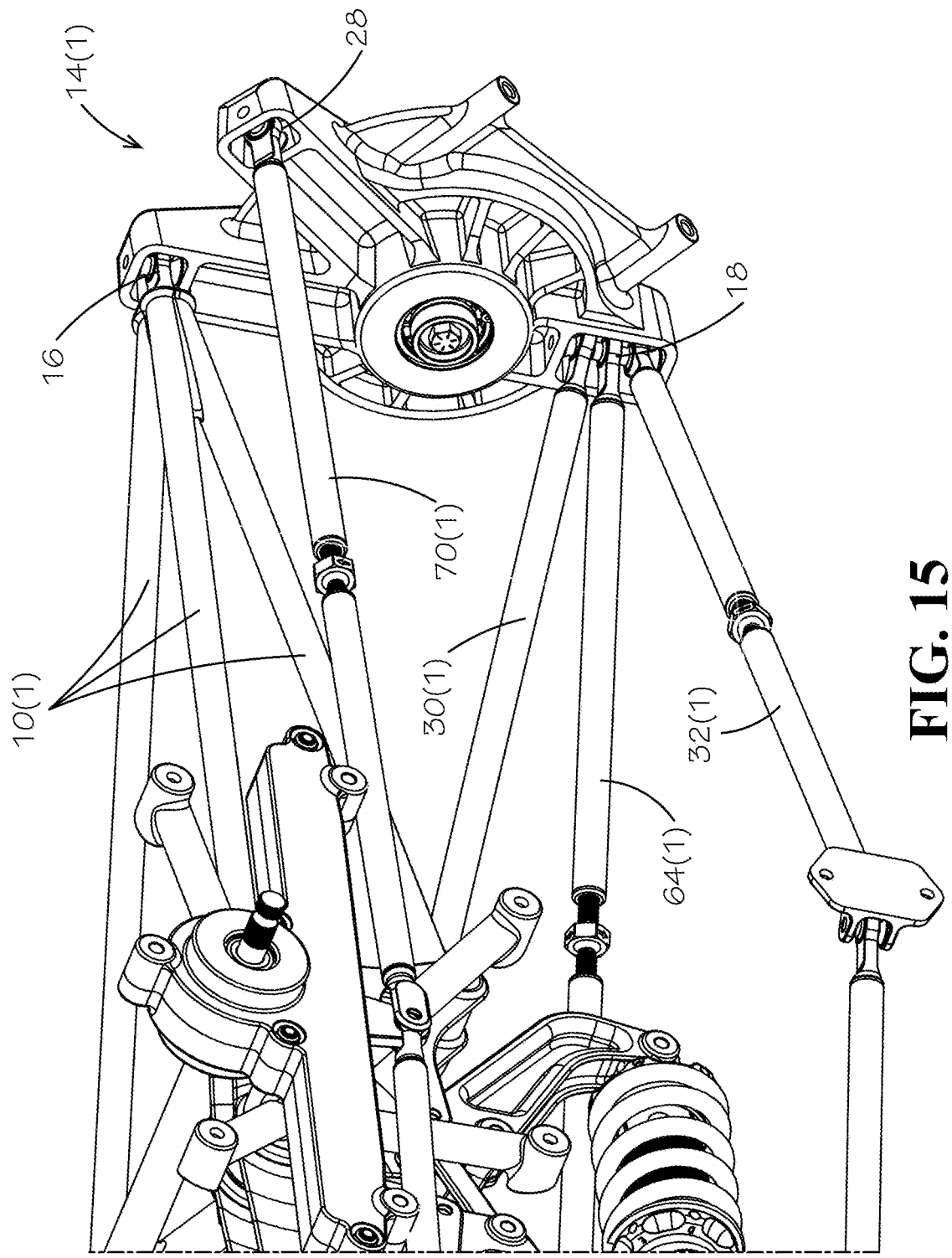
FIG. 15 is another perspective view of an exemplary embodiment of a vehicle suspension system showing the connection between a portion of the suspension system and a wheel upright.

FIG. 15 depicts one embodiment of various components of the wheel suspension system 100 connecting to the wheel upright 14. For example, the right axis arms 10(1) may connect to an upper pickup point 16. For example, the axis arms 10 may include an A-arm that may pivotably attach to a ball disposed on a rod end brushing. Similarly, the camber link 30(1), the weight transfer link 64(1), or the radius rod 32(1) may each pivotably attach to a lower pickup point 18 of the wheel upright 14. A steering rod 70(1) may pivotably attach to a steering attachment pickup point.

Figure 16:
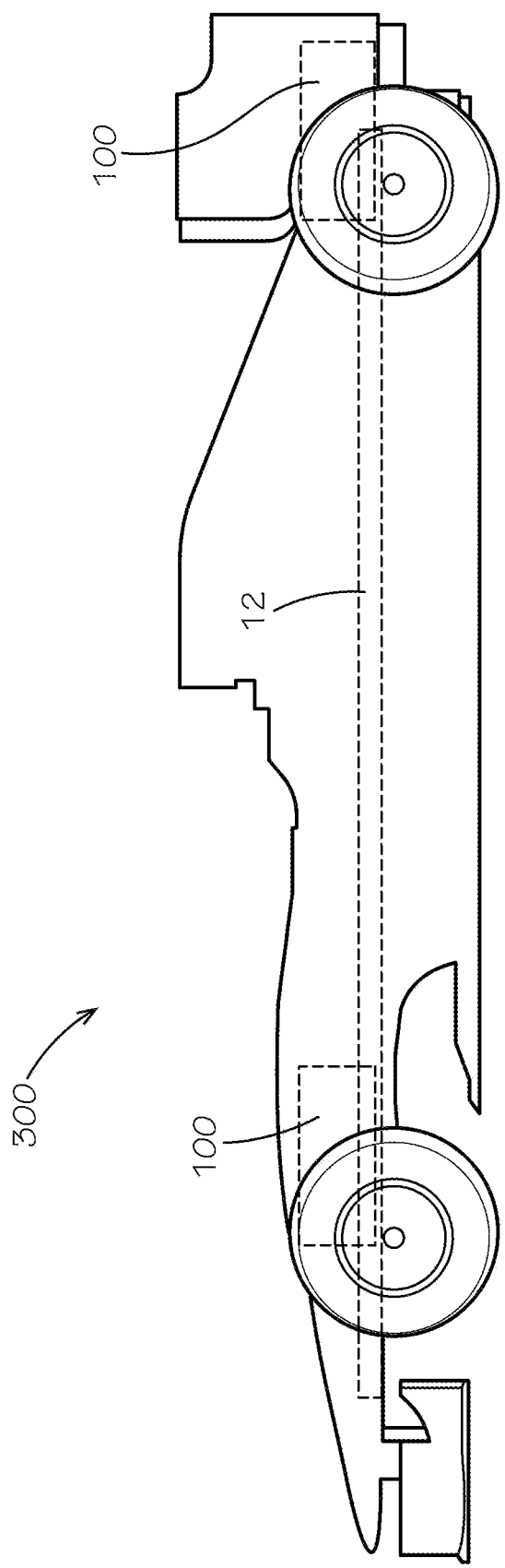
FIG. 16 is a side view of an exemplary embodiment of a vehicle with a vehicle suspension system.

FIG. 16 depicts one embodiment of a vehicle 300. The vehicle 300 may include a car. The car may include formula racing car (e.g., a Formulate One car), an open-wheel car, a stock car, a street car, a sports car, a touring car, or some other type of vehicle. The vehicle 300 may include a remote-controlled vehicle. The vehicle 300 may include a chassis 12. A wheel suspension system 100 may attach to the chassis 12. The system 100 may provide one or more of the advantages of the system 100 to the vehicle 300.

Thus, although there have been described particular embodiments of the present invention of a new and useful WEIGHT TRANSFER LINKAGE, it is not intended that such references be construed as limitations upon the scope of this invention.

What is claimed is:

1. A weight transfer system for a vehicle having a chassis, comprising:
   a pair of wheel uprights located on opposing sides of the chassis; and
   a pair of weight transfer links located on the opposing sides of the chassis,
   wherein each weight transfer link is disposed between the chassis and a corresponding wheel upright of the pair of wheel uprights,
   wherein each weight transfer link includes;
      a rod, including a first end and a second end disposed opposite the first end, and
      an springing shock disposed on the first end of the rod,
   wherein the springing shock of each weight transfer link includes:
      a main shock housing;
      a main shock shaft extending from a main shock housing;
      a secondary shock shaft;
      a secondary shock housing disposed around the secondary shock shaft;
      at least one spring disposed around the main shock housing; and
      a secondary spring disposed around the secondary shock housing,
   wherein the springing shock of each weight transfer link is connected to a chassis pickup point on the chassis, and
   wherein the second end of the rod of each weight transfer link is connected to its corresponding wheel upright.

2. The weight transfer system of claim 1, wherein:
   each wheel upright of the pair of wheel uprights includes an upper pickup point and a lower pickup point; and
   the upper pickup point is disposed above the lower pickup point on the respective wheel upright.

3. The weight transfer system of claim 2, wherein the second end of each rod being connected to its corresponding wheel upright includes the second end being connected to the lower pickup point of the corresponding wheel upright.

4. The weight transfer system of claim 1, wherein, in response to the chassis being in a static, neutral position, the lengths of the weight transfer links of the pair of weight transfer links are equal.

5. The weight transfer system of claim 1, wherein each springing shock has a preset limit on its spring resistance.

6. The weight transfer system of claim 5, wherein the springing shock is only capable of applying force until the respective weight transfer link reaches a predetermined length.

7. The wheel suspension system of claim 1, wherein a length of each weight transfer link is the distance between the chassis pickup point and the wheel upright when the chassis is in a static, neutral position.

8. A springing shock, comprising:
   a main shock housing;
   a main shock shaft extending from the main shock housing;
   a secondary shock shaft;
   a secondary shock housing disposed around the secondary shock shaft;
   a secondary shock sleeve, wherein the main shock housing is attached to the secondary shock sleeve;
   a sliding double spring retainer, wherein the main shock housing with the attached secondary shock sleeve is configured to slideably insert into the sliding double spring retainer;
   at least one spring disposed around the main shock housing; and
   a secondary spring disposed around the secondary shock housing.

9. The springing shock of claim 8, wherein the at least one spring is further disposed around the secondary shock housing.

10. The springing shock of claim 8:
further comprising a male rod end extending from the secondary shock shaft; and
wherein the male rod end includes a loop disposable on a chassis pickup point of a vehicle chassis.

11. The springing shock of claim 8, wherein:
the main shock housing includes a threaded aperture; and
the threaded aperture is configured to receive a threaded portion of an end of a weight transfer link.

12. The springing shock of claim 8, further comprising an extension tube including a threaded end configured to selectably connect to the main shock housing.

13. The springing shock of claim 8:
further including a main shock spring retainer; and
wherein the main shock housing includes a threaded outer diameter, and the main shock spring retainer is threaded onto the threated outer diameter of the main shock housing.

14. A weight transfer system for a vehicle having a chassis, comprising:
a pair of wheel uprights located on opposing sides of the chassis; and
a pair of weight transfer links located on the opposing sides of the chassis, wherein the pair of weight transfer links includes a left-side weight transfer link disposed on the left side of the chassis and a right-side weight transfer link disposed on the right side of the chassis, wherein each weight transfer link is disposed between the chassis and a corresponding wheel upright of the pair of wheel uprights, and wherein each weight transfer link includes
a rod, including a first end and a second end disposed opposite the first end, and
an springing shock disposed on the first end of the rod, the springing shock including
a main shock housing,
a main shock shaft extending from the main shock housing,
a secondary shock shaft,
a secondary shock housing disposed around the secondary shock shaft,
a secondary shock sleeve, wherein the main shock housing is attached to the secondary shock sleeve,
a sliding double spring retainer, wherein the main shock housing with the attached secondary shock sleeve is configured to slideably insert into the sliding double spring retainer, and
at least one spring disposed around the main shock housing,
wherein
the springing shock of each weight transfer link is pivotably attached-to a chassis pickup point on the chassis, and
the second end of the rod of each weight transfer link is pivotably attached to its corresponding wheel upright.

15. The weight transfer system of claim 14, wherein each weight transfer link of the pair of weight transfer links runs parallel to a corresponding axis arm of an axis arm system of the vehicle.

16. The weight transfer system of claim 14, wherein, in response to the vehicle making a right turn, the springing shock of the left-side weight transfer link of the pair of weight transfer links may activate.

17. The weight transfer system of claim 14, wherein, in response to the vehicle making a left turn, the springing shock of the right-side weight transfer link of the pair of weight transfer links may activate.

18. The weight transfer system of claim 14, wherein, in response to the chassis being in a static, neutral position, the lengths of the weight transfer links of the pair of weight transfer links are equal.

19. The weight transfer system of claim 14, wherein each springing shock has a preset limit on its spring resistance.

20. A springing shock, comprising:
a main shock housing;
a main shock shaft extending from the main shock housing;
a secondary shock shaft;
a secondary shock housing disposed around the secondary shock shaft;
a secondary shock sleeve, wherein the main shock housing is attached to the secondary shock sleeve;
a sliding double spring retainer, wherein the main shock housing with the attached secondary shock sleeve is configured to slideably insert into the sliding double spring retainer; and
at least one spring disposed around the main shock housing,
wherein the at least one spring is further disposed around the secondary shock housing.

21. A springing shock, comprising:
a main shock housing;
a main shock shaft extending from the main shock housing;
a secondary shock shaft;
a secondary shock housing disposed around the secondary shock shaft;
a secondary shock sleeve, wherein the main shock housing is attached to the secondary shock sleeve;
a sliding double spring retainer, wherein the main shock housing with the attached secondary shock sleeve is configured to slideably insert into the sliding double spring retainer;
at least one spring disposed around the main shock housing; and
a male rod end extending from the secondary shock shaft,
wherein the male rod end includes a loop disposable on a chassis pickup point of a vehicle chassis.

22. A springing shock, comprising:
a main shock housing;
a main shock shaft extending from the main shock housing;
a secondary shock shaft;
a secondary shock housing disposed around the secondary shock shaft;
a secondary shock sleeve, wherein the main shock housing is attached to the secondary shock sleeve;
a sliding double spring retainer, wherein the main shock housing with the attached secondary shock sleeve is configured to slideably insert into the sliding double spring retainer; and at least one spring disposed around the main shock housing,
wherein the main shock housing includes a threaded aperture, and the threaded aperture is configured to receive a threaded portion of an end of a weight transfer link.

23. A springing shock, comprising:
a main shock housing;
a main shock shaft extending from the main shock housing;
a secondary shock shaft;
a secondary shock housing disposed around the secondary shock shaft;
a secondary shock sleeve, wherein the main shock housing is attached to the secondary shock sleeve;
a sliding double spring retainer, wherein the main shock housing with the attached secondary shock sleeve is configured to slideably insert into the sliding double spring retainer;
at least one spring disposed around the main shock housing; and
an extension tube including a threaded end configured to selectably connect to the main shock housing.

24. A springing shock, comprising:
a main shock housing;
a main shock shaft extending from the main shock housing;
a secondary shock shaft;
a secondary shock housing disposed around the secondary shock shaft;
a secondary shock sleeve, wherein the main shock housing is attached to the secondary shock sleeve;
a sliding double spring retainer, wherein the main shock housing with the attached secondary shock sleeve is configured to slideably insert into the sliding double spring retainer;
at least one spring disposed around the main shock housing; and
a main shock spring retainer,
wherein the main shock housing includes a threaded outer diameter, and the main shock spring retainer is threaded onto the threated outer diameter of the main shock housing.

* * * * *